(12) United States Patent
Ludwig et al.

(10) Patent No.: US 8,165,449 B2
(45) Date of Patent: Apr. 24, 2012

(54) DV METADATA EXTRACTION

(75) Inventors: Charles Alan Ludwig, Renton, WA (US); James H. Dooley, IV, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2581 days.

(21) Appl. No.: 10/676,979

(22) Filed: Oct. 1, 2003

(65) Prior Publication Data

US 2005/0076039 A1    Apr. 7, 2005

(51) Int. Cl.
*H04N 9/80* (2006.01)

(52) U.S. Cl. ......... 386/239; 386/314; 386/323; 386/331

(58) Field of Classification Search ............... 386/125, 386/239, 314, 323, 331; 707/100
See application file for complete search history.

(56) References Cited

U.S. PATENT DOCUMENTS

| | | | | |
|---|---|---|---|---|
| 5,646,796 | A | * | 7/1997 | Kimura et al. ............... 360/72.2 |
| 5,712,947 | A | * | 1/1998 | Oguro et al. .................... 386/69 |
| 5,724,474 | A | * | 3/1998 | Oguro et al. .................... 386/95 |
| 5,845,044 | A | * | 12/1998 | Iizuka et al. ................. 386/117 |
| 5,905,844 | A | * | 5/1999 | Kimura et al. .................. 386/95 |
| 6,009,233 | A | * | 12/1999 | Tsujimura et al. ............. 386/95 |
| 6,026,212 | A | * | 2/2000 | Oguro ............................. 386/67 |
| 6,061,692 | A | | 5/2000 | Thomas et al. |
| 6,130,726 | A | | 10/2000 | Darbee et al. |
| 6,256,390 | B1 | * | 7/2001 | Okuyama et al. ............. 380/201 |
| 6,344,939 | B2 | * | 2/2002 | Oguro ............................. 360/27 |
| 6,516,029 | B1 | * | 2/2003 | Wang ....................... 375/240.01 |
| 6,570,728 | B2 | * | 5/2003 | Iizuka et al. .................... 360/69 |
| 6,611,803 | B1 | | 8/2003 | Furuyama et al. |
| 6,611,812 | B2 | | 8/2003 | Hurtado et al. |
| 6,611,845 | B1 | | 8/2003 | Dockter et al. |
| 6,624,843 | B2 | | 9/2003 | Lennon |
| 2002/0122659 | A1 | * | 9/2002 | McGrath et al. ............... 386/117 |
| 2002/0131443 | A1 | * | 9/2002 | Robinett et al. ............... 370/442 |
| 2005/0030980 | A1 | * | 2/2005 | Debique et al. ............... 370/536 |
| 2005/0033760 | A1 | * | 2/2005 | Fuller et al. .................... 707/100 |

FOREIGN PATENT DOCUMENTS

CN    1393882    1/2003

(Continued)

OTHER PUBLICATIONS

J. Fong et al., "Continuous and incremental data mining association rules using frame metadata model," Knowledge-Based Systems 16 (2003), Elsevier Science B.V., pp. 91-100.

(Continued)

*Primary Examiner* — Thai Tran
*Assistant Examiner* — Girumsew Wendmagegn
(74) *Attorney, Agent, or Firm* — Lee & Hayes, PLLC

(57) ABSTRACT

A set of interfaces, data structures and events represent a DV metadata extraction tool. The DV metadata extraction tool includes an API (application programming interface) for describing DV metadata packs that are to be extracted from a DV data stream. The extraction API supports methods for specifying and removing DV metadata packs to be extracted from DV frames. The DV metadata extraction tool also includes an API for describing a container that holds DV metadata once it has been extracted from a DV frame. The container API supports methods for adding and removing DV structures to the container and for retrieving data from the container, removing data from the container, and iterating through the container. The DV metadata extraction tool also includes a collection of higher-level structures that represent unpacked DV metadata packs.

22 Claims, 7 Drawing Sheets

FOREIGN PATENT DOCUMENTS

WO           WO0169936 A2     9/2001

OTHER PUBLICATIONS

Jens Wellhausen and Holger Crysandt, "Temporal Audio Segmentation Using MPEG-7 Descriptors," Proceedings of SPIE-IS&T Electronic Imaging, SPIE vol. 5021 (2003) pp. 380-387.

Jose M. Martinez et al., "MPEG-7: The Generic Multimedia Content Description Standard, Part 1," IEEE Multimedia, Apr.-Jun. 2002, vol. 9, No. 2, pp. 78-87.

Pei Yin et al., "Automatic Time Stamp Extraction System for Home Videos," IEEE 2002, vol. 2, pp. 73-76. Proceedings of May 2002 International Symposium on Circuits and Systems.

Jeffrey A. Bloom et al., "Copy Protection for DVD Video," Proceedings of the IEEE, vol. 87, No. 7, Jul. 1999, pp. 1267-1276.

Daniel Helm et al., "A Toolset for Determining Social Networks on the Web," ACTA Press 2002, Proceedings of the IASTED International Conference Information and Knowledge Sharing Nov. 18-20, 2002, pp. 128-132.

* cited by examiner

DV METADATA EXTRACTION

TECHNICAL FIELD

The present disclosure generally relates to processing multimedia data, and more particularly, to extracting metadata from DV formatted multimedia data.

BACKGROUND

DV is a digital video format used world-wide for digital video cameras. The DV format is an international standard that was created by a consortium of companies typically referred to as the DV consortium. DV, originally known as DVC (Digital Video Cassette), uses a metal evaporate tape to record very high quality digital video. The DV video specification, IEC 61834, specifies the content, format and recording method of data blocks forming helical records on the digital tape. It also describes the common specifications for cassettes, modulation method, magnetization and basic system data, for digital video cassette recording systems using 6.35 mm (¼ inch) magnetic tape, and the electrical and mechanical characteristics of equipment which provides for the interchangeability of recorded cassettes.

DV video information is carried in a data stream at a rate of about 29 megabits per second (3.7 MByte/sec). A DV video frame typically includes 10 DIF sequences, each of which consists of 150 DIF blocks having 80 bytes of data each. In addition to video and audio data, each DV video frame includes extra data associated with the video and audio data called DV metadata.

DV metadata can include a wide range of data associated with the video data in a DV frame. For example, DV metadata can include the time and date that video was recorded, various settings on the camcorder at the time the video was recorded, and so on. According to IEC 61834-4, DV metadata is divided into 256 separate "packs". Although 256 packs are reserved for DV metadata, many of the packs have yet to be defined. Each pack consists of 5 bytes. The first byte in each DV metadata pack is the pack ID, and the next four bytes consist of binary fields.

The DV format permits each DV video frame to stand on its own without having to rely on any data from preceding or following frames. For example, the same metadata is repeated numerous times within a DV frame. The redundancy built into each DV frame and the wealth of additional data (i.e., metadata) inherent to the DV format make DV video an ideal format for editing. However, various difficulties prevent current DV editing applications from taking full advantage of the unique features of DV video that make it ideally suited for editing.

In a typical DV scenario, video is recorded and converted to digital form in a camcorder. The video data on the digital tape can be played in a digital tape drive, such as the one in the camcorder, in a DVCR, or in a standalone unit. DV data can be transferred electronically via firewire to a computer's hard disk. The transfer process is typically performed by a capture driver, a standalone utility, or a component of an editing application executing on a computer such as a desktop personal computer. During the transfer process, the DV data is "wrapped" into a file format commonly understood by computers, such as AVI for Windows or Quicktime for the Mac. Therefore, once the transfer process is finished, the DV data on the computer hard drive is wrapped in a file format that standard editing applications can process. Various editing applications, such as Adobe® Premiere® Pro, enable nonlinear video editing through real-time video and audio editing tools.

However, as indicated above, current DV editing applications take little or no advantage of the rich information provided in the DV video format that makes it ideally suited for editing. The main reason for this is that it is difficult to extract the DV metadata from within DV video frames. DV metadata extraction currently requires an application developer to write its own custom code for extracting specifically desired metadata. In addition, an extraction process implemented by a DV editing application would be very processor intensive, which would hinder the performance of other editing functions of the application. One consequence of these difficulties is that DV metadata is generally not exploited by most DV editing applications.

Accordingly, a need exists for a way to extract DV metadata from DV data streams.

SUMMARY

Extraction of DV metadata from a DV data stream is described herein.

In accordance with one implementation, an instruction is received specifying additional per-frame DV metadata to be extracted from a DV data stream. The metadata is extracted from DV frames of the DV data stream.

In accordance with another implementation, metadata is stored in a container and the container is attached to a DV sample of a DV frame. The container is manageable to have additional DV metadata structures stored within it and to provide for the retrieval of metadata items that have been stored within it.

In accordance with yet another implementation, a DV metadata structure is stored within the container. The DV metadata structure is an unpacked version of a DV metadata pack. The DV metadata structure includes binary values unpacked from the DV metadata pack and a different variable name associated with each binary value.

BRIEF DESCRIPTION OF THE DRAWINGS

The same reference numerals are used throughout the drawings to reference like components and features.

DETAILED DESCRIPTION

Overview

The following discussion is directed to a set of interfaces, data structures and events for representing a DV metadata extraction tool. The DV metadata extraction tool includes an API (application programming interface) for describing DV metadata packs that are to be extracted from a DV data stream. The extraction API is called IMFExtractDVMetadata, and it supports methods for specifying and removing DV metadata packs to be extracted from DV frames. The extraction API also supports methods for determining the number of DV metadata packs in an extraction list and determining the ID of a DV metadata pack at a given index in the extraction list.

The DV metadata extraction tool also includes an API for describing a container that holds DV metadata once it has been extracted from a DV frame. The container API is called IMFDVMetadataContainer, and it supports methods for adding and removing DV structures to the container and for retrieving data from the container, removing data from the container, and iterating through the container. The DV metadata extraction tool also includes a collection of higher-level structures that represent unpacked DV metadata packs.

The DV metadata extraction tool is generally described within the context of the Media Foundation architecture by Microsoft® Corporation. However, it is noted that the DV metadata extraction tool is designed and described herein in a manner that enables its use in any suitable multimedia architecture.

Exemplary Environment

Figure 1:
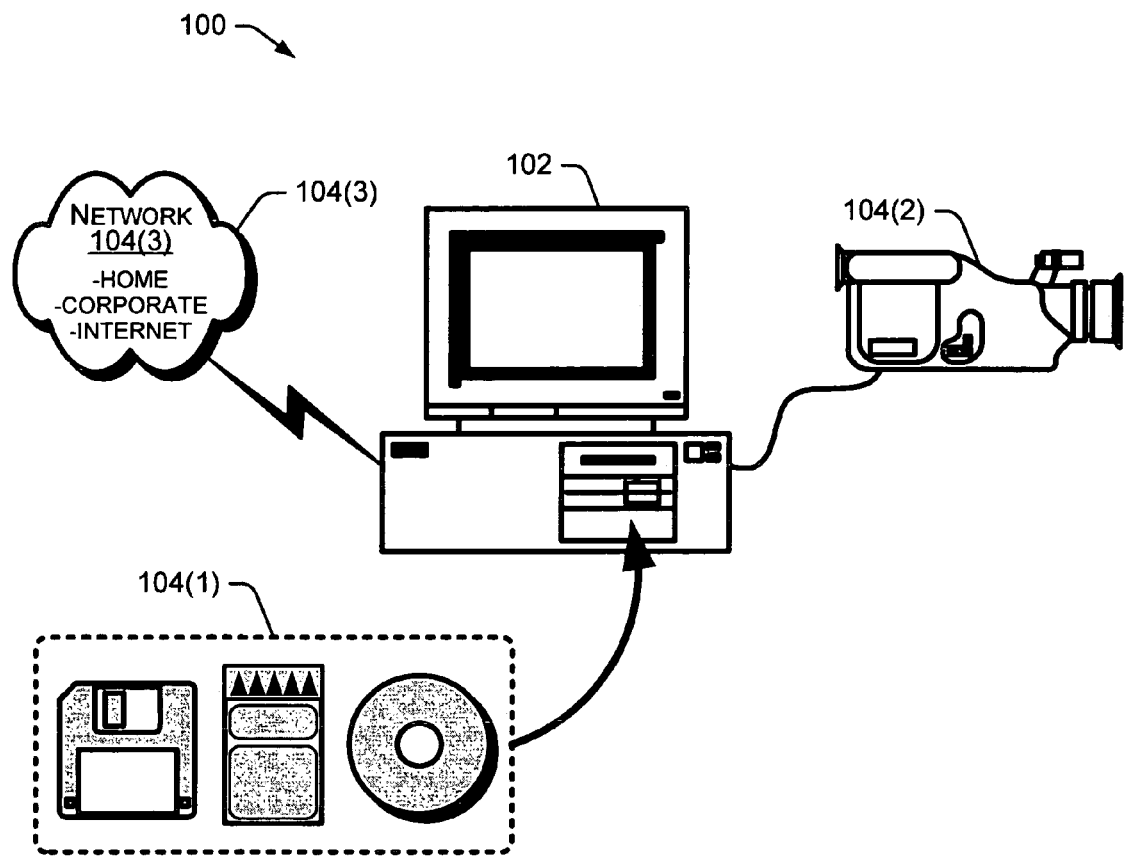
FIG. 1 illustrates an exemplary environment suitable for DV metadata extraction.

FIG. 1 illustrates an exemplary environment 100 that is suitable for DV metadata extraction. The exemplary environment 100 of FIG. 1 includes a computer 102 and one or more DV video input sources 104.

DV video input sources 104 can be any type of device or communication network capable of transferring DV video content to computer 102, including for example, portable storage media 104(1) (e.g., magnetic discs, media cards, optical discs), a DV video recording device 104(2) (e.g., a digital camcorder), or a network 104(3) such as the Internet, a corporate network, or a home network.

Video recording device 104(2) can be any of various digital recording devices capable of recording live-motion video and audio in DV format (i.e., on a digital tape) for later replay via a digital tape drive, for example, in a DVCR, a camcorder, or a personal computer such as computer 102. A video recording device 104(2) is typically capable of being connected directly to computer 102 using an i.LINK (IEEE 1394) or FireWire digital interface, so that DV video content can be edited directly on the computer 102.

Computer 102 may be implemented as various computing devices generally capable of receiving video content from various sources 104 and manipulating the video content for editing and playback through a resident multimedia architecture such as the Media Foundation architecture by Microsoft Corporation, for example. Computer 102 is otherwise typically capable of performing common computing functions, such as email, calendaring, task organization, word processing, Web browsing, and so on. In the described embodiments, computer 102 runs an open platform operating system, such as the Windows® brand operating systems from Microsoft®. Computer 102 may be implemented, for example, as a desktop computer, a server computer, a laptop computer, or other form of personal computer (PC). One exemplary implementation of computer 102 is described in more detail below with reference to FIG. 8.

As discussed in greater detail below with reference to the exemplary embodiments, computer 102 is generally configured with a multimedia architecture that includes a DV metadata extraction tool enabling the extraction of DV metadata from DV data.

Exemplary Embodiments

Figure 2:
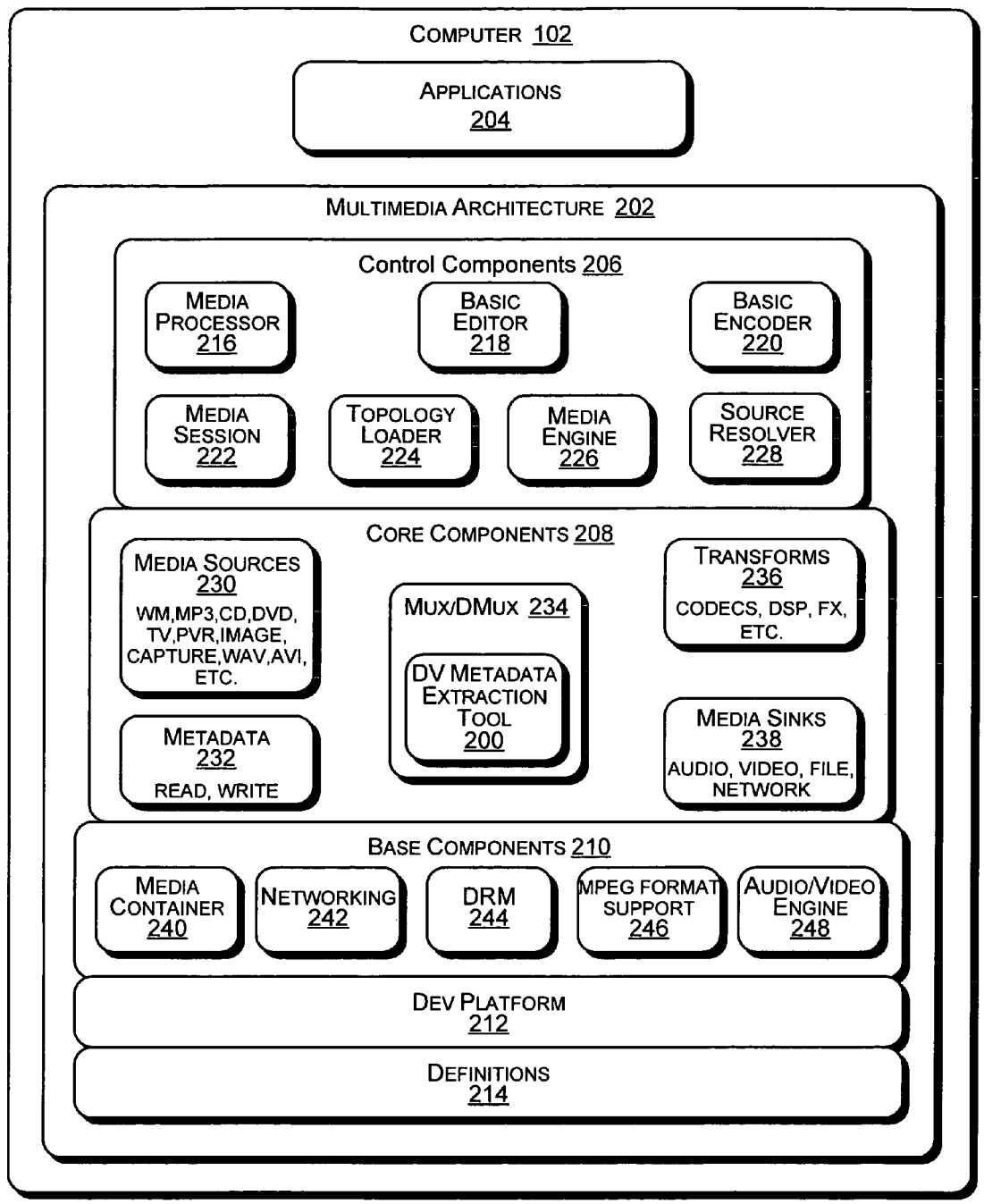
FIG. 2 illustrates an exemplary embodiment of a computer suitable for extracting DV metadata from a DV data stream.

FIG. 2 illustrates an exemplary embodiment of a computer 102 suitable for 11 extracting DV metadata from a DV data stream. A multimedia architecture and related components facilitating DV metadata extraction are described throughout this disclosure in the general context of computer/processor-executable instructions, such as program modules being executed by a personal computer. Generally, program modules include routines, programs, objects, components, data structures, etc., that perform particular tasks or implement particular abstract data types. Moreover, those skilled in the art will appreciate that such program modules may be implemented using other computer system configurations, including hand-held devices, multi-processor systems, microprocessor based or programmable consumer electronics, network PCs, minicomputers, mainframe computers, and the like. Furthermore, such program modules may also be practiced in distributed computing environments where tasks are performed by remote processing devices that are linked through a communications network. In a distributed computing environment, program modules may be located in both local and remote memory storage devices. In the current computing environment of FIG. 2, computer 102 is generally illustrated as having program modules located in a local memory (not shown). As indicated above, an exemplary implementation of computer 102 is described in greater detail below with reference to FIG. 8.

The DV metadata extraction tool 200 shown in FIG. 2 may operate in the context of a multimedia architecture 202 such as Microsoft's Media Foundation. However, the DV metadata extraction tool 200 is not limited to operation in such an architecture 202. Thus, the DV metadata extraction tool 200 might also be implemented, for example, as a stand alone component or a subcomponent of another application program. Prior to describing the DV metadata extraction tool 200, a brief description of the multimedia architecture 202 will be provided with reference to FIG. 2.

As shown in FIG. 2, multimedia architecture 202 includes various component layers: In addition, multimedia architecture 202 also generally includes supporting or associated media applications 204. Such applications 204 are illustrated in FIG. 2 separately from the multimedia architecture 202, but might also be shown as a part of the architecture 202. The component layers of multimedia architecture 202 include control component layer 206, core component layer 208, base component layer 210, development platform layer 212 and definition layer 214.

Components of control component layer 208 include media processor 234, basic editor 218, basic encoder 220, media session 222, topology loader 224, media engine 226, and source resolver 228. These components generally make up task oriented API's (application programming interfaces) that may be fully managed or un-managed. The control components 206 generally provide management functions that perform tasks such as linking together appropriate core layer components 208 for processing media. For example, the topology loader 224 checks the multimedia data type of an incoming media file and determines which processing components (i.e., 230, 232, 234, 236, 238) of the core layer components 208 need to be linked into a processing chain in order to properly render the data type. Note that for purposes of this disclosure, the media data type is DV data. A media engine component 226 of the control layer 206 manages the processing of the data through the chain of processing components (i.e., 230, 232, 234, 236, 238) assembled by the topology loader 224. For example, the media engine 226 pushes the data through the processing chain, controlling when to stop playback, start playback play backwards, jump to a particular time, and so on.

Core layer components 208 include media sources 230, metadata read/write 232, MUX/Dmux 234, transforms 236, and media sinks 238. Media sources 230 provide multimedia data through a generic, well-defined interface. The media sources 230 describe the presentation, including video data streams to be accessed. There are many implementations of media sources for providing multimedia data from different multimedia file types or devices. However, the present disclosure is directed to multimedia in a DV format.

The transforms 236 of core layer 208 each perform some type of transformation operation on multimedia data through a generic, well-defined interface. Transform examples include codecs, DSPs, video resizers, audio resamplers, statistical processors, color resamplers, and others. Although the MUX/Dmux 234 (Dmux 234, hereinafter) is illustrated separately within core layer 208, it is one representation of a transform 236 that takes interleaved multimedia data as an input, and separates the data into individually useful media streams of multimedia data. Thus, in the context of this disclosure, the Dmux 234 is a DV Dmux 234 that, among other things, splits out the video and audio components of DV frames or samples from a DV media source 230.

The Dmux 234 is also illustrated within the multimedia architecture 202 of FIG. 2 as including DV metadata extraction tool 200. As described in further detail herein below, Dmux 234 supports DV metadata extraction through the DV metadata extraction tool 200. The DV metadata extraction tool 200 generally allows the user to create and manage an extraction list of DV Metadata packs to be extracted from a DV data stream. Once a DV metadata pack ID is added to the extraction list, the DV Dmux 234 extracts the associated DV metadata pack from each DV frame as it splits out the video and audio components of the DV frame. The DV Dmux 234 stores the DV metadata pack in a container and attaches the container to the outgoing video sample as an extended attribute. Although the DV metadata extraction tool 200 is discussed herein in conjunction with, or as a part of, Dmux 234, this is not intended as a limitation as to where the DV metadata extraction tool 200 can be implemented within the core layer 208 or elsewhere. Implementing the DV metadata extraction tool 200 within the Dmux 234 is a preferred embodiment because of the benefits of efficiency provided by the splitting function of the Dmux 234. Thus, the DV metadata extraction tool 200 may just as easily be part of the media source 230, a DMO (DirectX Media Object), or a stand-alone software component anywhere else that has access to the DV data stream. The DV metadata extraction process is discussed in greater detail below with reference to subsequent figures.

Media sinks (sinks) 238 are also included in the core layer 208 processing components. Sinks 238 generally accept multimedia data as input through a generic, well-defined interface. There are many implementations of media sinks for performing different functions with multimedia data, such as writing multimedia data to a given file type or to a network, or displaying the multimedia data on a video monitor using a video card.

The base components 210 and development platform 212 of multimedia architecture 202 generally make up mostly un-managed API's. The base components 210 include media container 240, networking 242, DRM 244, MPEG format support 246, and audio/video engine 248. These components generally perform individual functions in support of multimedia architecture 202. The development platform 212 generally includes resource management infrastructure and common primitive types such as samples, clocks, events, buffers, and so on. The definitions layer of multimedia architecture 202 includes definitions and policies related to schemas, protocols, and formats (e.g., metadata, device models, types, etc.).

Figure 3:
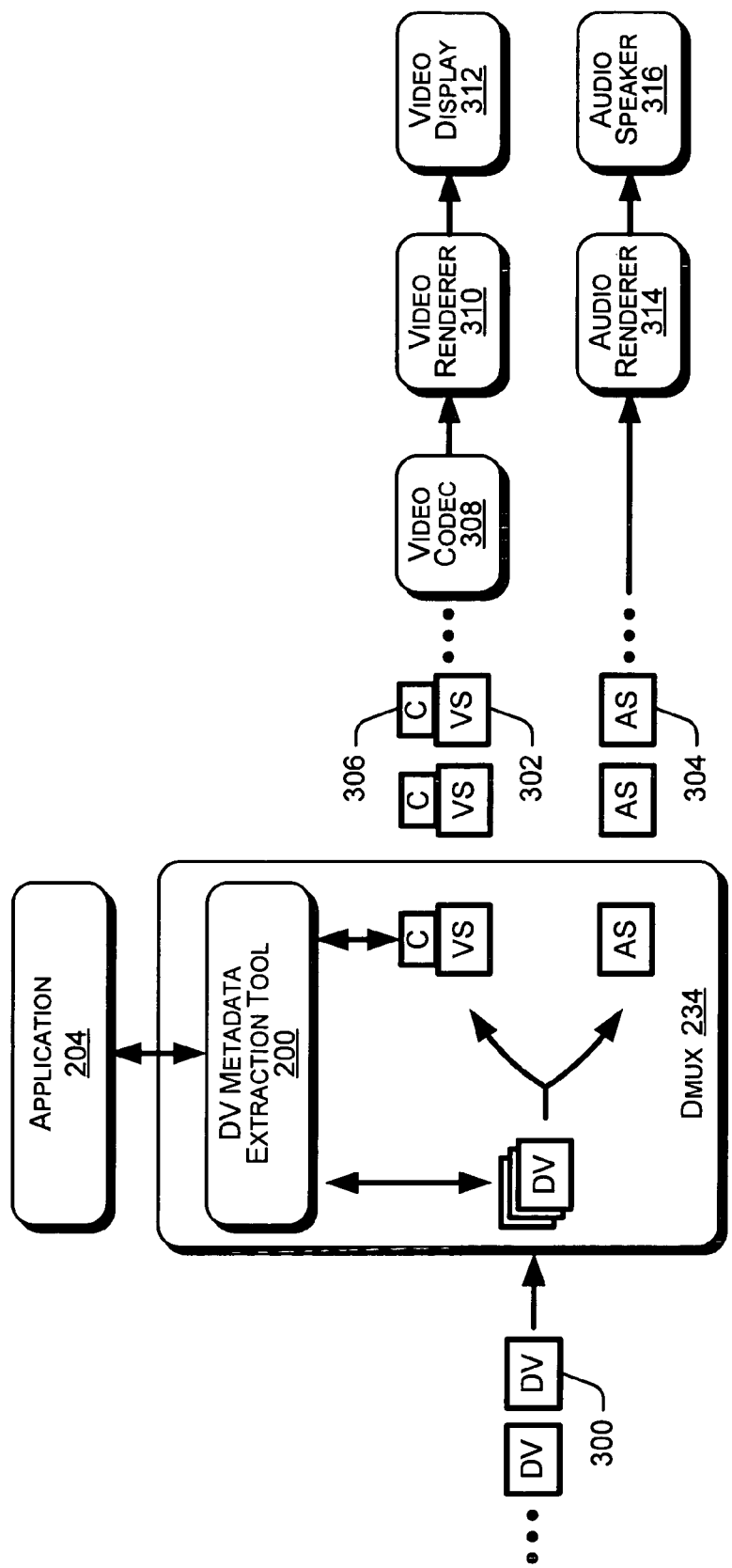
FIG. 3 illustrates an example of DV data being processed through various processing components.

FIG. 3 illustrates an example of DV data being processed through various processing components of the core layer 208, including the DV metadata extraction tool 200 of Dmux 234, as briefly discussed above. DV data samples (DV frames) 300 enter the Dmux 234 where they are split into video samples 302 and audio samples 304. The video samples 302 proceed through the processing chain to various processing components such as video codec 308 and video renderer 310, after which they might be displayed on a video display 312. The audio samples 304 proceed through the processing chain to various processing components such as audio renderer 314, after which they might be played through an audio speaker 316. While the Dmux 234 is splitting out the DV samples 300, it also extracts DV metadata packs that it locates within the DV samples 300 in accordance with DV metadata pack IDs (DVPackIDs) from an extraction list (see FIG. 4). Upon locating a DV metadata pack whose DVPackID is in the extraction list, the Dmux 234 extracts the DV metadata pack and stores it in a container 306 and attaches the container 306 to the corresponding outgoing video sample 302 as an extended attribute.

Figure 5:
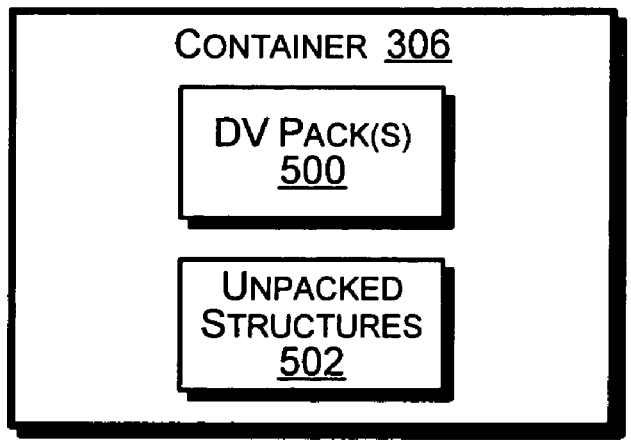
FIG. 5 illustrates a container having one or more DV metadata packs and one or more unpacked DV_METADATA structures.

For a certain subset of DV metadata packs, the DV metadata extraction tool 200 also provides extended support of DV pack-specific data structures, called DV_METADATA structures (see FIG. 5). In addition to storing the DV metadata packs in the container 306 for these extended support packs, the Dmux 234 also stores the unpacked DV_METADATA structures in the container 306. Thus, for certain extended support DV metadata packs, the DV metadata extraction tool 200 breaks down the packed data into usable DV pack-specific data structures, or DV_METADATA structures. FIG. 5 illustrates a container 306 having one or more DV metadata packs 500 and one or more unpacked DV_METADATA structures 502 that correspond with the DV metadata packs 500.

According to IEC 61834-4, there are 256 DV metadata packs in the DV format. The 256 DV metadata packs are shown herein below in a reference section of this disclosure entitled Interface Definition Language. Although 256 packs are reserved for DV metadata, many of the packs have yet to be defined. The binary pack layout for various DV metadata packs is shown in the Interface Definition Language reference section. The DV metadata pack binary layouts included are for those DV metadata packs that are specifically supported as unpacked DV pack-specific data structures (i.e., DV_METADATA structures). Thus, the Interface Definition Language section also includes the unpacked DV_METADATA structures for the specifically supported DV metadata packs. In general, each DV metadata pack consists of 5 bytes in its binary layout. The first byte in each DV metadata pack is the DVPackID, and the next four bytes consist of binary fields.

Figure 4:
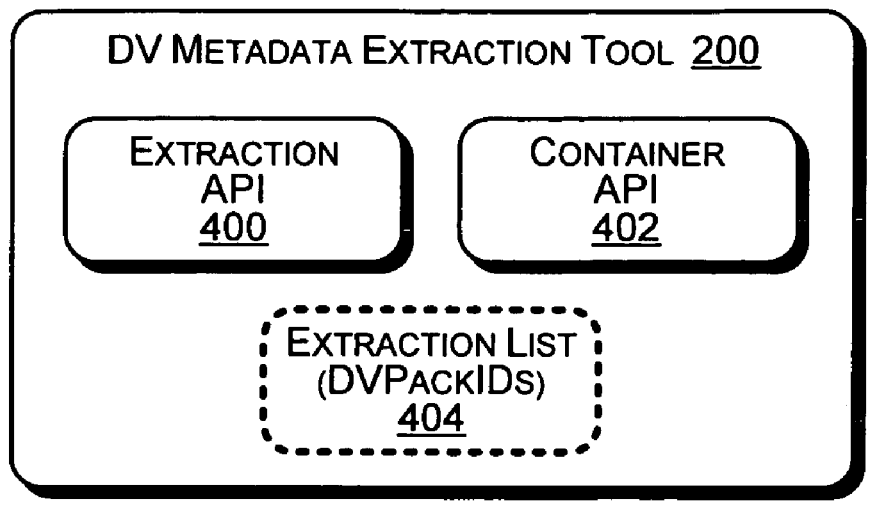
FIG. 4 illustrates components of a DV metadata extraction tool.

Referring again to FIGS. 3 and 4, the DV metadata extraction tool 200 supports an extraction API 400 (application programming interface) that maintains the extraction list 404 through various methods. The DV metadata extraction tool 200 also supports a container API 402 that will be discussed below. FIG. 4 illustrates the DV metadata extraction tool 200 along with the extraction API 400 and container API 402 it supports. Also shown in FIG. 4 is the extraction list 404, which may contain various DVPackIDs. The extraction API 400 is called the IMFExtractDVMetadata API, and the methods it supports include AddPack, RemovePack, RemoveAllPacks, GetCount, and GetPack.

The AddPack method adds the specified pack to the extraction list 404 of DV Packs to be extracted on each DV frame 300 according to the following syntax:

```
HRESULT AddPack(
    BYTE DVPackID
);
```

DVPackID is an input parameter that specifies the PackID for a DV metadata pack. This is a member of the DVPACKID enum. In a resulting DV_METADATA structure the PackID is in DvMetadata.Pack[0]. The only pack that cannot be added to the extraction list 404 is DVPAC_NO_INFO (0xFF) (see the Interface Definition Language section).

If the AddPack method succeeds, it returns S_OK. However, an E_INVALIDARG will be returned if the DVPackID is DVPACK_NO_INFO. Other errors may also be returned.

A call to AddPack from an editing application 204, for example, adds a DVPackID to the extraction list 404. The function will succeed even if the pack (i.e., the DVPackID) has previously been added. The packs are not reference counted so a pack needs only to be removed once even if it has been added twice.

The RemovePack method removes the specified pack from the extraction list 404 of packs to be extracted on each DV frame 300 according to the following syntax:

```
HRESULT RemovePack(
    BYTE DVPackID
);
```

DVPackID is an input parameter that specifies the PackID for a DV metadata pack. This is a member of the DVPACKID enum. In a resulting DV_METADATA structure, the PackID is in DvMetadata.Pack[0].

If the RemovePack method succeeds, it returns S_OK. If the pack is not in the extraction list 404 then the function returns E_ITEM_NOT_FOUND. Other error codes may also be returned.

A call to RemovePack from an editing application 204, for example, removes the specified pack from the extraction list 404.

The RemoveAllPacks method clears the extraction list 404 of DV Packs that the Dmux 234 would extract according to the following syntax:

HRESULT RemoveAllPacks( );

There are no parameters input with the RemoveAllPack method. If the method succeeds, it returns S_OK. Other error codes may also be returned. Calling RemoveAllPack, by an editing application 204, for example, clears the entire extraction list 404.

The GetCount method returns the number of DV packs that are in the extraction list 404 according to the following syntax:

```
HRESULT GetCount(
    DWORD* pCount
);
```

The pCount parameter is an output parameter that specifies the number of packs in the extraction list 404. If the method succeeds, it returns S_OK. Calling GetCount retrieves the number of items (i.e., DVPackID's) in the extraction list 404.

The GetPackID method returns the DVPackID of a pack at a given index in the extraction list 404 according to the following syntax:

```
HRESULT GetPack(
    DWORD Index,
    BYTE* pDVPackID
);
```

The Index parameter is an input parameter that is the index in the extraction list 404 of the desired DVPack ID. The pDVPackID is an output parameter that is a pointer to a byte where the object will copy the DVPack ID of the item found at the specified index.

If the GetPackID method succeeds, it returns S_OK. If the Index is out of range, the method returns the error code, MF_E_INVALIDINDEX. If an error is returned the value OF pDVPackID is DVPACK_NO_INFO (0xFF).

The GetPackID method allows the caller (e.g., application 204) to retrieve the full list of items to be extracted by repeatedly calling GetPackId and incrementing the index until E_INVALIDARG is returned.

As mentioned above, the DV metadata extraction tool 200 also supports a container API 402 (see FIG. 4). The container 306 (FIG. 3) is placed as a sample attribute on the video sample 302 that is split out by the Dmux 234. The container API 400 is called the IMFDVMetadataContainer API, and the methods it supports include Add, Remove, RemoveAll, GetCount, Lock, Unlock, GetFirst and GetNext. In general, the IMFDVMetadataContainer API provides a general mechanism for adding attributes to the list, removing attributes from the list, clearing the container 306 and iterating through the container 306.

The Add method adds a DV pack-specific data structure, or DV_METADATA structure, to the container 306 according to the following syntax:

```
HRESULT Add(
    const DV_METADATA* pMetadata,
    UINT32* puIndex
);
```

The pMetadata parameter is an input parameter that is a constant pointer to a DV_METADATA structure. pMetadata->cbSize is used to allocate memory in the container 306 and a copy of the entire DV_METADATA structure placed in the newly allocated memory.

The ulIndex is an output parameter that returns the index of the newly added DV_METADATA structure. The index may change if additional structures are added or deleted from the container 306.

If the Add method succeeds, it returns S_OK. It may also return E_OUTOFMEMORY if it is unable to allocate sufficient space for the new item. This operation will complete in constant time O(k). This operation will block until the lock is released if the container has been locked by another thread. (see Lock and Unlock methods below).

The Remove method removes a DV pack-specific data structure, or DV_METADATA structure, from the container 306 according to the following syntax:

```
HRESULT Remove(
    UINT32 uIndex
);
```

The uIndex parameter is an input parameter that indicates the index of the item that is to be removed from the container 306. When an item is removed from the container 306 the index of items that remains in the container 306 may change.

If the method succeeds, it returns S_OK. It may also return E_INVALIDARG if an item with a matching index cannot be found. This includes the case when the container 306 is empty. This operation will complete in linear time O(n), where n is the number of items stored in the list. This operation will block until the lock is released if the container has been locked by another thread. (see Lock and Unlock methods below).

The RemoveAll method clears all items (e.g., DV metadata packs and DV pack-specific data structures) from the container 306 according to the following syntax:

```
HRESULT RemoveAll( );
```

There are no parameters input with the RemoveAll method. If the method succeeds, it returns S_OK and there will be no more items in the container 306. However, it does not necessarily follow that the memory will be freed. The container 306 may implement a pooling scheme to avoid repeated small allocations. This operation will complete in linear time O(n), where n is the number of items in the container 306. This operation will block until the lock is released if the lock has been acquired on another thread. (see Lock and Unlock methods below).

The GetCount method returns the count of items in the container 306 according to the following syntax:

```
HRESULT GetCount(
    UINT32* puCount
);
```

The puCount parameter is an output parameter that returns number of items currently in the container 306. If the method succeeds, it returns S_OK.

This operation will complete in constant time O(k). The count returned is only valid at the time that the call was made. Objects may be added or removed by other threads. Locking the object will prevent other threads from adding or removing items from the container until the lock is released. (see Lock and Unlock methods below).

The Lock method is used to lock the container 306 for exclusive access. This guarantees that the container 306 can be iterated and the returned pointers to DV_METADATA structures will remain valid as long as the lock owner does not add or remove items. The syntax for this method is as follows:

```
HRESULT Lock( );
```

There are no input parameters with the Lock method. If the method succeeds, it returns S_OK. It may return other error codes. If the Lock is unavailable, the call will block until the lock can be acquired.

The Unlock method releases the lock obtained via the Lock method according to the following syntax.

```
HRESULT Unlock( )
    UINT32* puIndex,
    const DV_METADATA** pMetadata
);
```

There are no input parameters with the Unlock method. If the method succeeds, it returns S_OK. It may return other error codes.

The GetFirst method starts iterating from the beginning of the container 306 according to the following syntax:

```
HRESULT GetFirst(
    UINT32* puIndex,
    Const DV_METADATA** ppMetadata
);
```

The puIndex parameter is an output parameter that specifies the index of the item retrieved from the container 306. The ppMetadata parameter is an output parameter that specifies a pointer to the objects internal data structure containing the metadata. This pointer may be invalidated if items are added or removed from the container 306.

If the method succeeds, it returns S_OK. The method may return E_INVALIDARG if the index is out of range or the container 306 has had an item added or removed from it since the last call to GetFirst( ). The method will return MF_E_IN- VALIDREQUEST if the object has not been locked. Calling the Lock method ensures that items are not added or removed from the container 306 by other threads while iterating the list.

The GetNext method iterates through each item in the container 306 according to the syntax:

```
HRESULT GetNext(
    UINT32* puIndex,
    Const DV_METADATA** ppMetadata
);
```

The puIndex parameter is an output parameter that specifies the index of the item retrieved from the container 306. The ppMetadata parameter is an output parameter that specifies a pointer to the objects internal data structure containing the metadata. This pointer may be invalidated if items are added or removed from the container 306.

If the method succeeds, it returns S_OK. The method may return E_INVALIDARG if the index is out of range or the container 306 has had an item added or removed from it since the last call to GetFirst( ). The method will return MF_E_INVALIDREQUEST if the object has not been locked. Calling the Lock method ensures that items are not added or removed from the container 306 by other threads while iterating the list.

Exemplary Methods

Example methods for extracting DV metadata from a DV data stream will now be described with primary reference to the flow diagrams of FIGS. 6-7. The methods apply generally to the exemplary embodiments discussed above with respect to FIGS. 2-5. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

Figure 6:
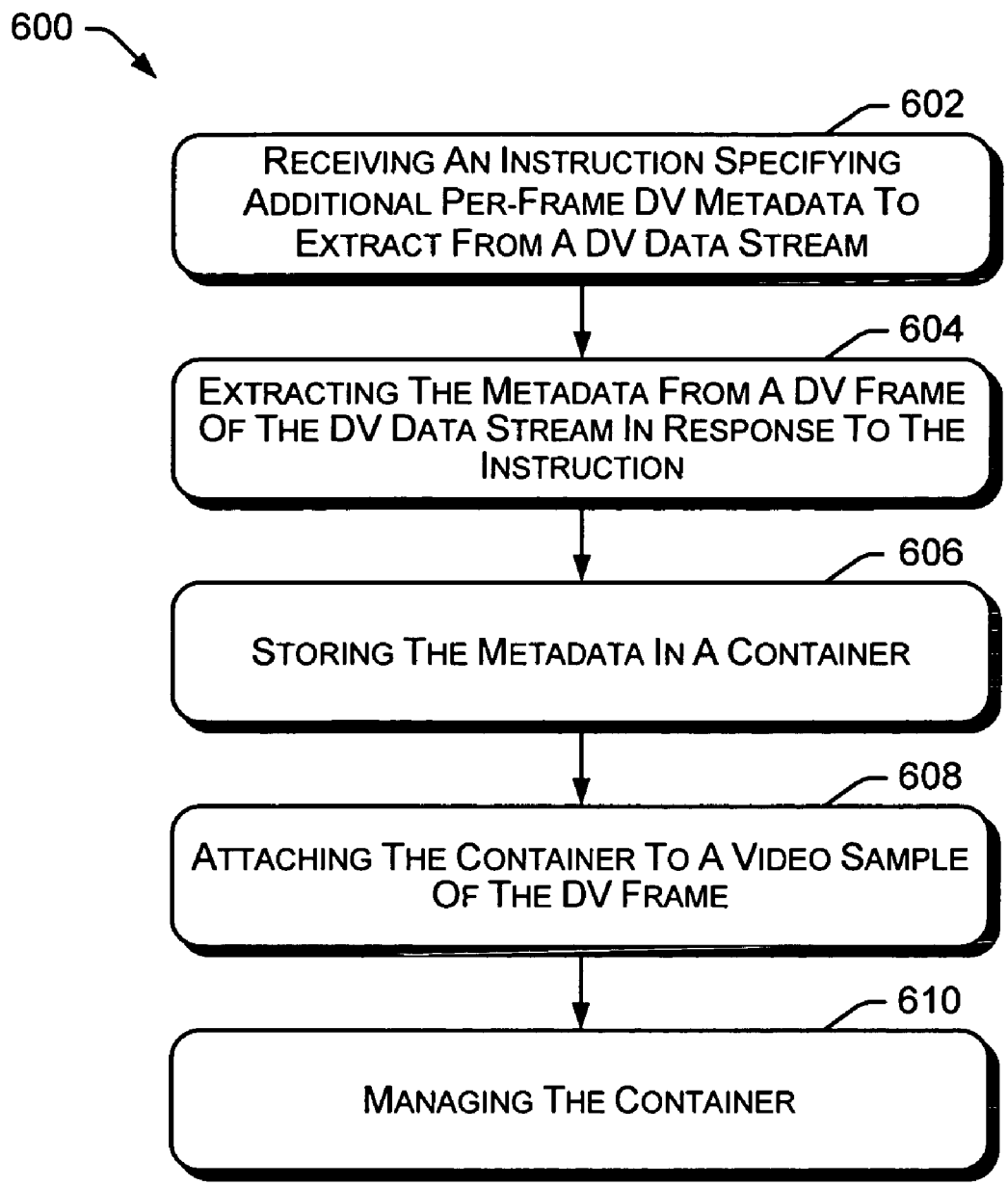
FIG. 6 illustrates a block diagram of an exemplary method for extracting DV metadata from a DV data stream.

FIG. 6 shows an exemplary method 600 for extracting DV metadata from a DV data stream. At block 602, an instruction is received that specifies additional per-frame DV metadata to extract from a DV data stream. The instruction is received by a DV metadata extraction tool 200 that can be part of a multimedia architecture 202 on a computer 102. The instruction is typically received from an application 204, such as a DV editing application executing on computer 102. The instruction is directed to an extraction interface 400 of the DV metadata extraction tool 200 in the form of a method call supported by the extraction interface 400. The instruction identifies the DV metadata by a DVPackID included within the method call. Method calls supported by the extraction interface 400 include an AddPack method call to add a DVPackID to a DV metadata extraction list 404, a RemovePack method call to remove a DVPackID from the extraction list 404, and a RemoveAllPacks method call to remove all DVPackIDs from the extraction list 404. Additional method calls supported by the extraction interface 400 include a GetCount method call that returns a number indicating an amount of DVPackIDs present in the extraction list 404 and a GetPackID method call that returns a DVPackID at a specified index in the extraction list 404.

At block 604, the DV metadata specified in the instruction is extracted from a DV frame of the DV data stream. In one implementation, a Dmux 234 within a core layer 208 of the multimedia architecture 202 extracts the specified DV metadata as it splits the DV frame 300 into component video 302 and audio 304 samples. The extraction includes the Dmux 234 looking at the DV metadata extraction list 404 to determine which DV metadata packs to extract. At block 606, the DV metadata is stored in a container 306. At block 608, the container is attached to a video sample 302 split off of the DV frame 300 by the Dmux 234.

At block 610, the container is managed by the DV metadata extraction tool 200. The DV metadata extraction tool 200 includes a container interface 402 that supports methods by which applications 204 can access and manage data in the container 306. Method calls supported by the container interface 402 are an Add method call that adds a DV_METADATA structure to the container, a Remove method call that removes a DV_METADATA structure from the container, a RemoveAll method call that removes all items from the container, a GetCount method call that returns a number indicating an amount of items present in the container, a Lock method call that locks the container for exclusive access, an Unlock method call that unlocks the container, a GetFirst method call that retrieves an item from the container at a beginning index of the container, and a GetNext method call that retrieves an item from the container at a next index of the container.

Figure 7:
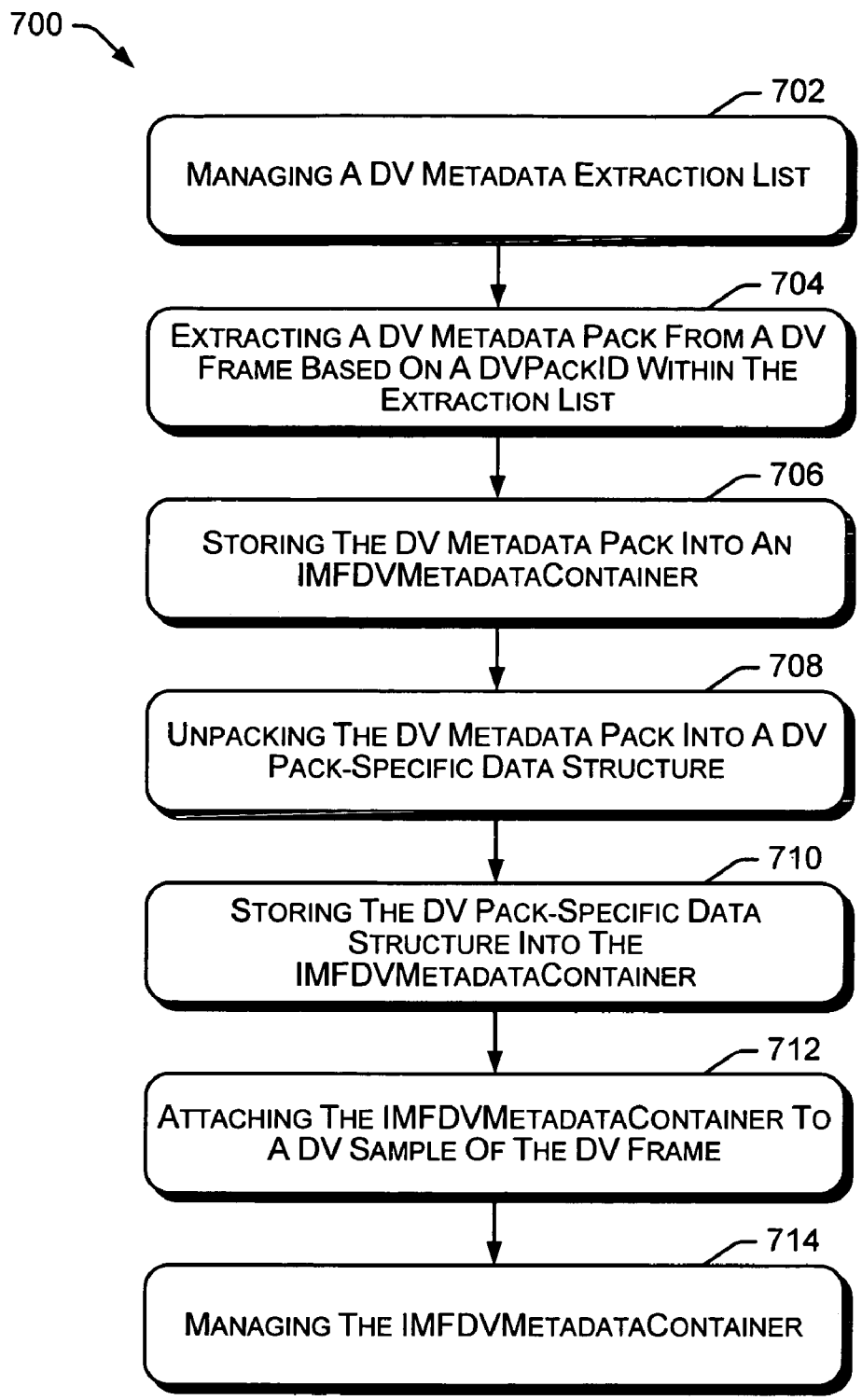
FIG. 7 illustrates a block diagram of another exemplary method for extracting DV metadata from a DV data stream.

FIG. 7 shows another exemplary method 700 for extracting DV metadata from a DV data stream. At block 702, a DV metadata extraction list 404 is managed. The extraction list 404 is managed by a DV metadata extraction tool 200. The DV metadata extraction tool 200 supports an extraction interface 400 for managing the extraction list through various methods. Methods supported by the extraction interface 400 include an AddPack method call to add a DVPackID to a DV metadata extraction list 404, a RemovePack method call to remove a DVPackID from the extraction list 404, and a RemoveAllPacks method call to remove all DVPackIDs from the extraction list 404. Additional methods supported by the extraction interface 400 include a GetCount method call that returns a number indicating an amount of DVPackIDs present in the extraction list 404 and a GetPackID method call that returns a DVPackID at a specified index in the extraction list 404.

At block 704, a DV metadata pack is extracted from a DV frame 300 based on a DVPackID in the extraction list 404. In one implementation, a Dmux 234 within a core layer 208 of the multimedia architecture 202 extracts the specified DV metadata pack as it splits the DV frame 300 into component video 302 and audio 304 samples. The extraction includes the Dmux 234 looking at the DV metadata extraction list 404 to determine which DV metadata packs to extract. At block 706, the DV metadata pack is stored in an IMFDVMetadataContainer 306.

At block 708, the DV metadata pack is unpacked into a DV pack-specific data structure. The DV pack-specific data structure breaks out the packed binary data from the DV metadata pack and assigns binary values to corresponding variable names, making it easy for an application program 204 to utilize the data from the DV metadata pack. At block 710, the DV pack-specific data structure is stored in the IMFDVMetadataContainer 306, and at block 712, the IMFDVMetadataContainer 306 is attached to a DV video sample 302 split off of the DV frame 300 by the Dmux 234.

At block 714, the IMFDVMetadataContainer 306 is managed by the DV metadata extraction tool 200. The DV metadata extraction tool 200 includes a container interface 402 that supports methods by which applications 204 can access and manage data in the container 306. Method calls supported by the container interface 402 are an Add method call that adds a DV pack-specific data structure (called a DV_METADATA structure) to the container, a Remove method call that removes a DV_METADATA structure from the container, a RemoveAll method call that removes all items from the container, a GetCount method call that returns a number indicating an amount of items present in the container, a Lock method call that locks the container for exclusive access, an Unlock method call that unlocks the container, a GetFirst method call that retrieves an item from the container at a beginning index of the container, and a GetNext method call that retrieves an item from the container at a next index of the container.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 8:
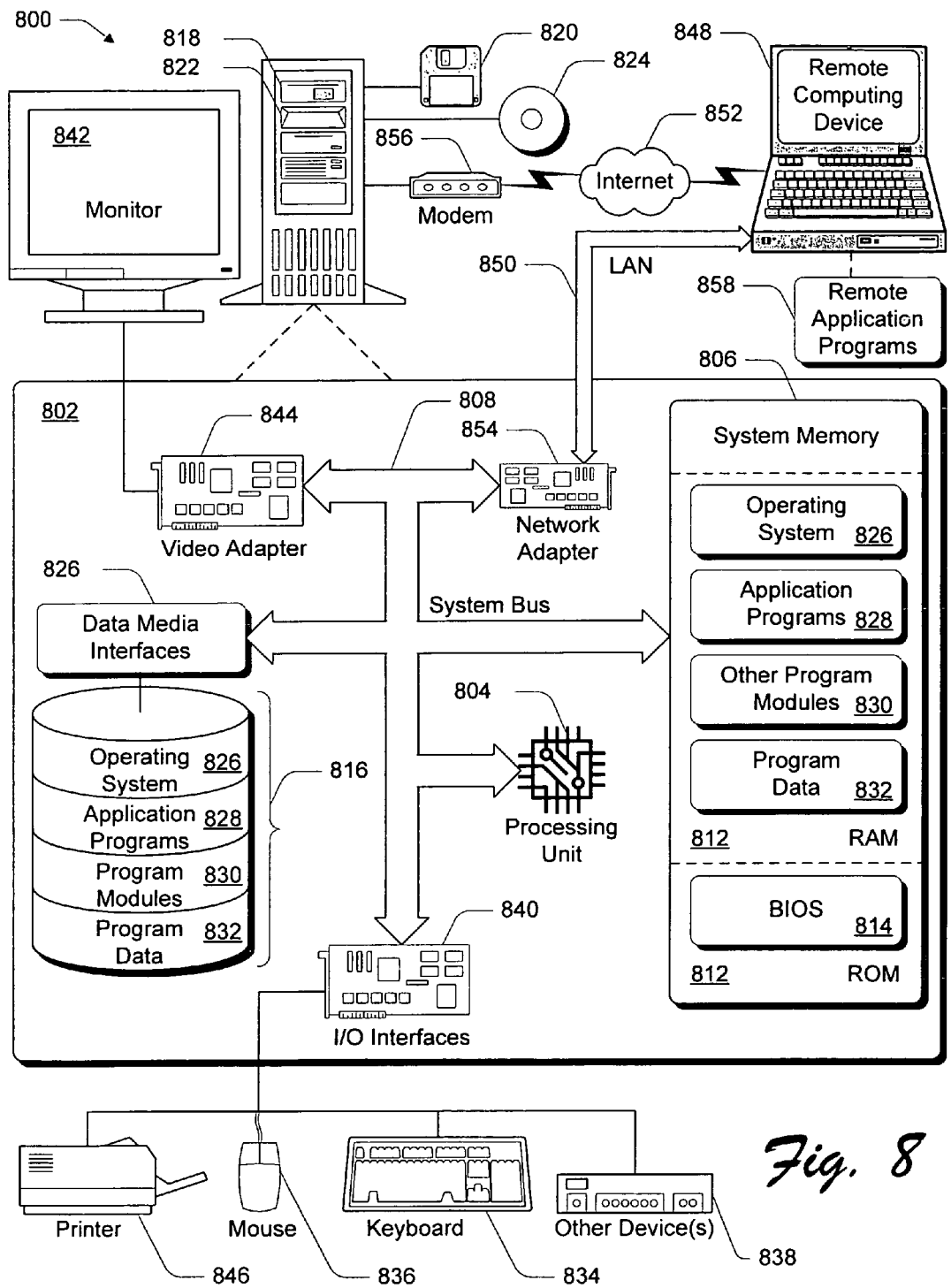
FIG. 8 illustrates an exemplary computing environment suitable for implementing a computer such as that in FIG. 2.

FIG. 8 illustrates an exemplary computing environment 800 suitable for implementing a computer 102. Although one specific configuration is shown, client computer 102 may be implemented in other computing configurations.

The computing environment 800 includes a general-purpose computing system in the form of a computer 802. The components of computer 802 can include, but are not limited to, one or more processors or processing units 804, a system memory 806, and a system bus 808 that couples various system components including the processor 804 to the system memory 806.

The system bus 808 represents one or more of any of several types of bus 11 structures, including a memory bus or memory controller, a peripheral bus, an accelerated graphics port, and a processor or local bus using any of a variety of bus architectures. An example of a system bus 808 would be a Peripheral Component Interconnects (PCI) bus, also known as a Mezzanine bus.

Computer 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternatively, the hard disk drive 816, magnetic disk drive 818, and optical disk drive 822 can be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of a caching scheme for user network access information.

Computer 802 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

Interface Definition Language

As indicated above, this IDL (Interface Definition Language) section lists the 256 DV metadata packs as well as the binary pack layout for various of those packs specifically supported in an extended manner as DV pack-specific data structures (i.e., DV_METADATA structures) by the DV metadata extraction tool 200. This section also includes the specific layouts of the unpacked DV metadata packs for the supported DV_METADATA structures. The DV metadata packs that have extended support are identified in the following table:

TABLE 1

| CONTROL | |
|---|---|
| CASSETTE ID | 0X00 |
| TAPE LENGTH | 0x01 |
| TEXT HEADER | 0x08 |
| TEXT | 0x09 |
| TAG | 0x0B |
| TITLE | |
| TIME CODE | 0x13 |
| BINARY GROUP | 0x14 |
| TEXT HEADER | 0x18 |
| TEXT | 0x19 |
| PROGRAM | |
| PROGRAM REC DTIME | 0x42 |
| AAUX | |
| SOURCE | 0x50 |
| SOURCE CONTROL | 0x51 |
| REC DATE | 0x52 |
| REC TIME | 0x53 |
| BINARY GROUP | 0x54 |
| CLOSED CAPTION | 0x55 |
| TR | 0x56 |
| VAUX | |
| SOURCE | 0x60 |
| SOURCE CONTROL | 0x61 |
| REC DATE | 0x62 |
| REC TIME | 0x63 |
| BINARY GROUP | 0x64 |
| CLOSED CAPTION | 0x65 |
| TR | 0x66 |
| CAMERA | |
| CONSUMER CAMERA 1 | 0x70 |
| CONSUMER CAMERA 2 | 0x71 |
| CAMERA SHUTTER | 0x7F |

Each DV pack-specific data structure (i.e., DV_METADATA structure) that has extended support by the DV metadata extraction tool 200 starts with a size and a DV Pack. The size member contains the size of the complete DV_METADATA structure. The DVPack (5 byte array) is the raw DV metadata. Each pack consists of 5 bytes. The first byte is the pack ID from Table 1 above. The next four bytes contain bit-fields containing the data. Each of the extended support packs has an associated structure where the bit-fields are unpacked and lightly processed into a more useable form. The full definition of the DV Packs is found in IEC 61834-4.

The 256 DV metadata packs and DV pack-specific data structures (i.e., DV_METADATA structures) supported by the DV metadata extraction tool 200 are as follows:

```
typedef enum _DVPACKID
{
    DVPACK_CONTROL_CASSETTE_ID       =    0x00,
    DVPACK_CONTROL_TAPE_LENGTH       =    0x01,
    DVPACK_CONTROL_TIMER_ACT_DATE    =    0x02,
    DVPACK_CONTROL_TIMER_ACS_S_S     =    0x03,
    DVPACK_CONTROL_PR_START_POINT_04 =    0x04,
    DVPACK_CONTROL_PR_START_POINT_05 =    0x05,
    DVPACK_CONTROL_TAG_ID_NO_GENRE   =    0x06,
    DVPACK_CONTROL_TOPIC_PAGE_HEADER =    0x07,
    DVPACK_CONTROL_TEXT_HEADER       =    0x08,
    DVPACK_CONTROL_TEXT              =    0x09,
    DVPACK_CONTROL_TAG_0A            =    0x0A,
    DVPACK_CONTROL_TAG_0B            =    0x0B,
    DVPACK_CONTROL_TELETEXT_INFO     =    0x0C,
    DVPACK_CONTROL_KEY               =    0x0D,
    DVPACK_CONTROL_ZONE_END_0E       =    0x0E,
    DVPACK_CONTROL_ZONE_END_0F       =    0x0F,
    DVPACK_TITLE_TOTAL_TIME          =    0x10,
    DVPACK_TITLE_REMAIN_TIME         =    0x11,
    DVPACK_TITLE_CHAPTER_TOTAL_NO    =    0x12,
    DVPACK_TITLE_TIME_CODE           =    0x13,
    DVPACK_TITLE_BINARY_GROUP        =    0x14,
    DVPACK_TITLE_CASSETTE_NO         =    0x15,
    DVPACK_TITLE_SOFT_ID_16          =    0x16,
    DVPACK_TITLE_SOFT_ID_17          =    0x17,
    DVPACK_TITLE_TEXT_HEADER         =    0x18,
    DVPACK_TITLE_TEXT                =    0x19,
    DVPACK_TITLE_TITLE_START_1A      =    0x1A,
    DVPACK_TITLE_TITLE_START_1B      =    0x1B,
    DVPACK_TITLE_REEL_ID_1C          =    0x1C,
    DVPACK_TITLE_REEL_ID_1D          =    0x1D,
    DVPACK_TITLE_TITLE_END_1E        =    0x1E,
    DVPACK_TITLE_TITLE_END_1F        =    0x1F,
    DVPACK_CHAPTER_TOTAL_TIME        =    0x20,
    DVPACK_CHAPTER_REMAIN_TIME       =    0x21,
```

```
DVPACK_CHAPTER_CHAPTER_NO     =    0x22,
DVPACK_CHAPTER_TIME_CODE      =    0x23,
DVPACK_CHAPTER_BINARY_GROUP   =    0x24,
DVPACK_CHAPTER_RESERVED_25    =    0x25,
DVPACK_CHAPTER_RESERVED_26    =    0x26,
DVPACK_CHAPTER_RESERVED_27    =    0x27,
DVPACK_CHAPTER_TEXT_HEADER    =    0x28,
DVPACK_CHAPTER_TEXT           =    0x29,
DVPACK_CHAPTER_CHAPTER_START_2A =  0x2A,
DVPACK_CHAPTER_CHAPTER_START_2B =  0x2B,
DVPACK_CHAPTER_RESERVED_2C    =    0x2C,
DVPACK_CHAPTER_RESERVED_2D    =    0x2D,
DVPACK_CHAPTER_CHAPTER_END_2E =    0x2E,
DVPACK_CHAPTER_CHAPTER_END_2F =    0x2F,
DVPACK_PART_TOTAL_TIME        =    0x30,
DVPACK_PART_REMAIN_TIME       =    0x31,
DVPACK_PART_PART_NO           =    0x32,
DVPACK_PART_TIME_CODE         =    0x33,
DVPACK_PART_BINARY_GROUP      =    0x34,
DVPACK_PART_RESERVED_35       =    0x35,
DVPACK_PART_RESERVED_36       =    0x36,
DVPACK_PART_RESERVED_37       =    0x37,
DVPACK_PART_TEXT_HEADER       =    0x38,
DVPACK_PART_TEXT              =    0x39,
DVPACK_PART_START_3A          =    0x3A,
DVPACK_PART_START_3B          =    0x3B,
DVPACK_PART_RESERVED_3C       =    0x3C,
DVPACK_PART_RESERVED_3D       =    0x3D,
DVPACK_PART_PART_END_3E       =    0x3E,
DVPACK_PART_PART_END_3F       =    0x3F,
DVPACK_PROGRAM_TOTAL_TIME     =    0x40,
DVPACK_PROGRAM_REMAIN_TIME    =    0x41,
DVPACK_PROGRAM_REC_DTIME      =    0x42,
DVPACK_PROGRAM_TIME_CODE      =    0x43,
DVPACK_PROGRAM_BINARY_GROUP   =    0x44,
DVPACK_PROGRAM_RESERVED_45    =    0x45,
DVPACK_PROGRAM_RESERVED_46    =    0x46,
DVPACK_PROGRAM_RESERVED_47    =    0x47,
DVPACK_PROGRAM_TEXT_HEADER    =    0x48,
DVPACK_PROGRAM_TEXT           =    0x49,
DVPACK_PROGRAM_PROGRAM_START_4A =  0x4A,
DVPACK_PROGRAM_PROGRAM_START_4B =  0x4B,
DVPACK_PROGRAM_RESERVED_4C    =    0x4C,
DVPACK_PROGRAM_RESERVED_4D    =    0x4D,
DVPACK_PROGRAM_PROGRAM_END_4E =    0x4E,
DVPACK_PROGRAM_PROGRAM_END_4F =    0x4F,
DVPACK_AAUX_SOURCE            =    0x50,
DVPACK_AAUX_SOURCE_CONTROL    =    0x51,
DVPACK_AAUX_REC_DATE          =    0x52,
DVPACK_AAUX_REC_TIME          =    0x53,
```

```
DVPACK_AAUX_BINARY_GROUP       =    0x54,
DVPACK_AAUX_CLOSED_CAPTION     =    0x55,
DVPACK_AAUX_TR                 =    0x56,
DVPACK_AAUX_RESERVED_57        =    0x57,
DVPACK_AAUX_TEXT_HEADER        =    0x58,
DVPACK_AAUX_TEXT               =    0x59,
DVPACK_AAUX_AAUX_START_5A      =    0x5A,
DVPACK_AAUX_AAUX_START_5B      =    0x5B,
DVPACK_AAUX_RESERVED_5C        =    0x5C,
DVPACK_AAUX_RESERVED_5D        =    0x5D,
DVPACK_AAUX_AAUX_END_5E        =    0x5E,
DVPACK_AAUX_AAUX_END_5F        =    0x5F,
DVPACK_VAUX_SOURCE             =    0x60,
DVPACK_VAUX_SOURCE_CONTROL     =    0x61,
DVPACK_VAUX_REC_DATE           =    0x62,
DVPACK_VAUX_REC_TIME           =    0x63,
DVPACK_VAUX_BINARY_GROUP       =    0x64,
DVPACK_VAUX_CLOSED_CAPTION     =    0x65,
DVPACK_VAUX_TR                 =    0x66,
DVPACK_VAUX_TELETEXT           =    0x67,
DVPACK_VAUX_TEXT_HEADER        =    0x68,
DVPACK_VAUX_TEXT               =    0x69,
DVPACK_VAUX_VAUX_START_6A      =    0x6A,
DVPACK_VAUX_VAUX_START_6B      =    0x6B,
DVPACK_VAUX_MARINE_MOUNTAIN    =    0x6C,
DVPACK_VAUX_LONGITUDE_LATITUDE =    0x6D,
DVPACK_VAUX_VAUX_END_6E        =    0x6E,
DVPACK_VAUX_VAUX_END_6F        =    0x6F,
DVPACK_CAMERA_CONSUMER_CAMERA_1 =   0x70,
DVPACK_CAMERA_CONSUMER_CAMERA_2 =   0x71,
DVPACK_CAMERA_RESERVED_72      =    0x72,
DVPACK_CAMERA_LENS             =    0x73,
DVPACK_CAMERA_GAIN             =    0x74,
DVPACK_CAMERA_PEDESTAL         =    0x75,
DVPACK_CAMERA_GAMMA            =    0x76,
DVPACK_CAMERA_DETAIL           =    0x77,
DVPACK_CAMERA_TEXT_HEADER      =    0x78,
DVPACK_CAMERA_TEXT             =    0x79,
DVPACK_CAMERA_RESERVED_7A      =    0x7A,
DVPACK_CAMERA_CAMERA_PRESET    =    0x7B,
DVPACK_CAMERA_FLARE            =    0x7C,
DVPACK_CAMERA_SHADING          =    0x7D,
DVPACK_CAMERA_KNEE             =    0x7E,
DVPACK_CAMERA_SHUTTER          =    0x7F,
DVPACK_LINE_HEADER             =    0x80,
DVPACK_LINE_Y                  =    0x81,
DVPACK_LINE_CR                 =    0x82,
DVPACK_LINE_CB                 =    0x83,
DVPACK_LINE_RESERVED_84        =    0x84,
DVPACK_LINE_RESERVED_85        =    0x85,
```

```
DVPACK_LINE_RESERVED_86 =        0x86,
DVPACK_LINE_RESERVED_87 =        0x87,
DVPACK_LINE_TEXT_HEADER =        0x88,
DVPACK_LINE_TEXT =               0x89,
DVPACK_LINE_LINE_START_8A =      0x8A,
DVPACK_LINE_LINE_START_8B =      0x8B,
DVPACK_LINE_RESERVED_8C =        0x8C,
DVPACK_LINE_RESERVED_8D =        0x8D,
DVPACK_LINE_LINE_END_8E =        0x8E,
DVPACK_LINE_LINE_END_8F =        0x8F,
DVPACK_MPEG_SOURCE =             0x90,
DVPACK_MPEG_SOURCE_CONTROL =     0x91,
DVPACK_MPEG_REC_DATE =           0x92,
DVPACK_MPEG_REC_TIME =           0x93,
DVPACK_MPEG_BINARY_GROUP =       0x94,
DVPACK_MPEG_STREAM =             0x95,
DVPACK_MPEG_RESERVED_96 =        0x96,
DVPACK_MPEG_RESERVED_97 =        0x97,
DVPACK_MPEG_TEXT_HEADER =        0x98,
DVPACK_MPEG_TEXT =               0x99,
DVPACK_MPEG_SERVICE_START_9A =   0x9A,
DVPACK_MPEG_SERVICE_START_9B =   0x9B,
DVPACK_MPEG_RESERVED_9C =        0x9C,
DVPACK_MPEG_RESERVED_9D =        0x9D,
DVPACK_MPEG_SERVICE_END_9E =     0x9E,
DVPACK_MPEG_SERVICE_END_9F =     0x9F,
DVPACK_RESERVED_RESERVED_A0 =    0xA0,
DVPACK_RESERVED_RESERVED_A1 =    0xA1,
DVPACK_RESERVED_RESERVED_A2 =    0xA2,
DVPACK_RESERVED_RESERVED_A3 =    0xA3,
DVPACK_RESERVED_RESERVED_A4 =    0xA4,
DVPACK_RESERVED_RESERVED_A5 =    0xA5,
DVPACK_RESERVED_RESERVED_A6 =    0xA6,
DVPACK_RESERVED_RESERVED_A7 =    0xA7,
DVPACK_RESERVED_RESERVED_A8 =    0xA8,
DVPACK_RESERVED_RESERVED_A9 =    0xA9,
DVPACK_RESERVED_RESERVED_AA =    0xAA,
DVPACK_RESERVED_RESERVED_AB =    0xAB,
DVPACK_RESERVED_RESERVED_AC =    0xAC,
DVPACK_RESERVED_RESERVED_AD =    0xAD,
DVPACK_RESERVED_RESERVED_AE =    0xAE,
DVPACK_RESERVED_RESERVED_AF =    0xAF,
DVPACK_RESERVED_RESERVED_B0 =    0xB0,
DVPACK_RESERVED_RESERVED_B1 =    0xB1,
DVPACK_RESERVED_RESERVED_B2 =    0xB2,
DVPACK_RESERVED_RESERVED_B3 =    0xB3,
DVPACK_RESERVED_RESERVED_B4 =    0xB4,
DVPACK_RESERVED_RESERVED_B5 =    0xB5,
DVPACK_RESERVED_RESERVED_B6 =    0xB6,
DVPACK_RESERVED_RESERVED_B7 =    0xB7,
```

```
DVPACK_RESERVED_RESERVED_B8 =    0xB8,
DVPACK_RESERVED_RESERVED_B9 =    0xB9,
DVPACK_RESERVED_RESERVED_BA =    0xBA,
DVPACK_RESERVED_RESERVED_BB =    0xBB,
DVPACK_RESERVED_RESERVED_BC =    0xBC,
DVPACK_RESERVED_RESERVED_BD =    0xBD,
DVPACK_RESERVED_RESERVED_BE =    0xBE,
DVPACK_RESERVED_RESERVED_BF =    0xBF,
DVPACK_RESERVED_RESERVED_C0 =    0xC0,
DVPACK_RESERVED_RESERVED_C1 =    0xC1,
DVPACK_RESERVED_RESERVED_C2 =    0xC2,
DVPACK_RESERVED_RESERVED_C3 =    0xC3,
DVPACK_RESERVED_RESERVED_C4 =    0xC4,
DVPACK_RESERVED_RESERVED_C5 =    0xC5,
DVPACK_RESERVED_RESERVED_C6 =    0xC6,
DVPACK_RESERVED_RESERVED_C7 =    0xC7,
DVPACK_RESERVED_RESERVED_C8 =    0xC8,
DVPACK_RESERVED_RESERVED_C9 =    0xC9,
DVPACK_RESERVED_RESERVED_CA =    0xCA,
DVPACK_RESERVED_RESERVED_CB =    0xCB,
DVPACK_RESERVED_RESERVED_CC =    0xCC,
DVPACK_RESERVED_RESERVED_CD =    0xCD,
DVPACK_RESERVED_RESERVED_CE =    0xCE,
DVPACK_RESERVED_RESERVED_CF =    0xCF,
DVPACK_RESERVED_RESERVED_D0 =    0xD0,
DVPACK_RESERVED_RESERVED_D1 =    0xD1,
DVPACK_RESERVED_RESERVED_D2 =    0xD2,
DVPACK_RESERVED_RESERVED_D3 =    0xD3,
DVPACK_RESERVED_RESERVED_D4 =    0xD4,
DVPACK_RESERVED_RESERVED_D5 =    0xD5,
DVPACK_RESERVED_RESERVED_D6 =    0xD6,
DVPACK_RESERVED_RESERVED_D7 =    0xD7,
DVPACK_RESERVED_RESERVED_D8 =    0xD8,
DVPACK_RESERVED_RESERVED_D9 =    0xD9,
DVPACK_RESERVED_RESERVED_DA =    0xDA,
DVPACK_RESERVED_RESERVED_DB =    0xDB,
DVPACK_RESERVED_RESERVED_DC =    0xDC,
DVPACK_RESERVED_RESERVED_DD =    0xDD,
DVPACK_RESERVED_RESERVED_DE =    0xDE,
DVPACK_RESERVED_RESERVED_DF =    0xDF,
DVPACK_RESERVED_RESERVED_E0 =    0xE0,
DVPACK_RESERVED_RESERVED_E1 =    0xE1,
DVPACK_RESERVED_RESERVED_E2 =    0xE2,
DVPACK_RESERVED_RESERVED_E3 =    0xE3,
DVPACK_RESERVED_RESERVED_E4 =    0xE4,
DVPACK_RESERVED_RESERVED_E5 =    0xE5,
DVPACK_RESERVED_RESERVED_E6 =    0xE6,
DVPACK_RESERVED_RESERVED_E7 =    0xE7,
DVPACK_RESERVED_RESERVED_E8 =    0xE8,
DVPACK_RESERVED_RESERVED_E9 =    0xE9,
```

```
DVPACK_RESERVED_RESERVED_EA  =      0xEA,
DVPACK_RESERVED_RESERVED_EB  =      0xEB,
DVPACK_RESERVED_RESERVED_EC  =      0xEC,
DVPACK_RESERVED_RESERVED_ED  =      0xED,
DVPACK_RESERVED_RESERVED_EE  =      0xEE,
DVPACK_RESERVED_RESERVED_EF  =      0xEF,
DVPACK_SOFT_MODE_MARKER_CODE =      0xF0,
DVPACK_SOFT_MODE_OPTION_F1   =      0xF1,
DVPACK_SOFT_MODE_OPTION_F2   =      0xF2,
DVPACK_SOFT_MODE_OPTION_F3   =      0xF3,
DVPACK_SOFT_MODE_OPTION_F4   =      0xF4,
DVPACK_SOFT_MODE_OPTION_F5   =      0xF5,
DVPACK_SOFT_MODE_OPTION_F6   =      0xF6,
DVPACK_SOFT_MODE_OPTION_F7   =      0xF7,
DVPACK_SOFT_MODE_OPTION_F8   =      0xF8,
DVPACK_SOFT_MODE_OPTION_F9   =      0xF9,
DVPACK_SOFT_MODE_OPTION_FA   =      0xFA,
DVPACK_SOFT_MODE_OPTION_FB   =      0xFB,
DVPACK_SOFT_MODE_OPTION_FC   =      0xFC,
DVPACK_SOFT_MODE_OPTION_FD   =      0xFD,
DVPACK_SOFT_MODE_OPTION_FE   =      0xFE,
DVPACK_NO_INFO               =      0xFF,
} DVPACKID;

typedef struct _DV_METADATA
{
    UINT32 cbSize;
    BYTE Pack[5];
} DV_METADATA;

typedef UINT32 DV_AUDIOBLOCK_ID;
        // May be 0 for DVSL
        // May be 0 - 1 for DVSD, DV25
        // May be 0 - 3 for DV50
        // May be 0 - 7 for DVH1 typedef struct _DV_AUDIO_METADATA
{
    DV_METADATA Metadata;
    DV_AUDIOBLOCK_ID AudioBlock;
} DV_AUDIO_METADATA;

// Pack Specific Structures
typedef struct _DV_METADATA_CONTROL_CASSETTE_ID
{
    DV_METADATA DVMetadata;
        // Binary Pack Layout
        // PC0  0 0 0 0 0 0 0 0
```

```
            // PC1   A 1 1 B B B C C
            // PC2   D D D E E E E
            // PC3   F F F F F F F
            // PC4   G G G G H H H H
            //
            // A : ME: Mic Error
            // B : MULTI-BYTES: Maximum number of words to be writtein
in one cycle of multi-writing operation
            // C : MEM TYPE: Memory Type
            // D : MEM SIZE of SPACE 0:
            // E : MEM SIZE of the LAST BLANK in SPACE1
            // F : MEM BANK NO. of SPACE 1
            // G : UNITS of TAPE THICKNESS
            // H : 1/10 of TAPE THICKENSS
            //
        BOOL MicError;
            // 0 : All events in this MIC do not always exist on this
tape
            // 1 : All events in this MIC certainly exist on this tape
        UINT32 MultiBytes;
            // 0 : 4 bytes
            // 1 : 8 bytes
            // 2 : 16 bytes
            // 3 - 6 : Reserved
            // 7 : Unlimited
        UINT32 MemoryType;
            // 0 : EEPROM
            // 1 : FeRAM
            // Others = Reserved
        UINT32 MemorySizeOfSpace0;
        UINT32 MemorySizeOfLastBankInSpace1;
            // 0 : 256 bytes
            // 1 : 512 bytes
            // 2 : 1 kbytes
            // 3 : 2 kbytes
            // 4 : 4 kbytes
            // 5 : 8 kbytes
            // 6 : 16 kbytes
            // 7 : 32 kbytes
            // 8 : 64 kbytes
            // Others : reserved
            // 0xF : No information
        UINT32 MemoryBankNoOfSpace1;
        UINT32 TapeThickness;
    } DV_METADATA_CONTROL_CASSETTE_ID;

typedef struct _DV_METADATA_CONTROL_TAPE_LENGTH
    {
        DV_METADATA DVMetadata;
```

```
            // Binary Pack Layout
            // PC0  0  0  0  0  0  0  0  1
            // PC1  A  A  A  A  A  A  AL 1
            // PC2  A  A  A  A  A  A  A
            // PC3  AM A  A  A  A  A  A
            // PC4  1  1  1  1  1  1  1  1
            //
            // A : Tape Length, MSB is at left of PC3 (M), LSB is at
right of PC1 (L).
            //
        UINT32 TapeLength;
    } DV_METADATA_CONTROL_TAPE_LENGTH;

typedef struct _DV_METADATA_TEXT_HEADER
    {
        DV_METADATA DVMetadata;
            // Binary Pack Layout
            // PC0  0  0  0  0  1  0  0  0         (For CONTROL TEXT
HEADER)
            // PC0  0  0  0  1  1  0  0  0         (For TITLE TEXT HEADER)
            // PC1  A  A  A  A  A  A  AL
            // PC2  B  B  B  B  C  C  C  AM
            // PC3  D  D  D  D  D  D  D
            // PC4  E  E  E  F  F  F  F  F
            //
            // A : TDP: Total number of text Data (see Figure 55 of
part 2)
            // B : TEXT TYPE
            // C : OPN: Option Number
            // D : TEXT CODE: TEXT CODE designates the character set.
            // E : AREA NO.: Area number indicates in which area on
the tape this topic is stored.
            // F : TOPIC TAG
            //
        UINT32 TotalTextData;
        UINT32 TextType;
            // 0 : Name
            // 1 : Memo
            // 2 : Station
            // 3 : Model
            // 6 : Operator
            // 7 : Subtitle
            // 8 : Outline
            // 9 : Full Screen
            // C : One byte coded font
            // D : Two byte coded font
            // E : Graphic
            // F : No Information
            // Others : Reserved
        UINT32 OptionNumber;
```

```
            UINT32 TextCode;
                // (See IEC 61834-4 for CONTROL TEXT header pack)
            UINT32 AreaNumber;
            UINT32 TopicTag;
            UINT32 cbTextPacks;
            [size_is(cbTextPacks)] BYTE   pTextPacks[];
                // text Pack Layout -- Each text pack has this layout
                // PC0 0  0  0  0  1  0  0  1    (For CONTROL TEXT)
                // PC0 0  0  0  1  1  0  0  1    (For TITLE TEXT)
                // PC1 ?  ?  ?  ?  ?  ?  ?  ?
                // PC2 ?  ?  ?  ?  ?  ?  ?  ?
                // PC3 ?  ?  ?  ?  ?  ?  ?  ?
                // PC4 ?  ?  ?  ?  ?  ?  ?
                // This pack contains font data, graphic data, or text
data
                // according to the TEXT TYPE designated in the associated
TEXT HEADER pack

} DV_METADATA_TEXT_HEADER;

typedef struct _DV_METADATA_TAG
        {
            DV_METADATA DVMetadata;
                // Binary Pack Layout
                // PC0 0  0  0  0  1  0  1  1   (For CONTROL TAG)
                // PC1 A  A  A  A  A  A  AL B
                // PC2 A  A  A  A  A  A  A
                // PC3 AM A  A  A  A  A  A
                // PC4 C  D  E  1  F  F  F  F
                //
                // A : Absolute Track Numnber
                // B : Blank Flag
                // C : Text Flag
                // D : Temporary True
                // E : Hold Flag
                // F : Tag ID
            UINT32 AbsoluteTrackNumber;
            BOOL BlankFlag;
                // 1 : Discontinuity exists before this absolute track
number
                // 0 : Discontinuity does not exist before this absolute
track number
            BOOL TextFlag;
                // 0 : Text information exists
                // 1 : No text information exists
            BOOL TemporaryTrue;
                // This flag is only valid for MIC
                // 0 : This event data in MIC is not always valid
                // 1 : This event data in MIC is valid
            BOOL HoldFlag;
```

```
            // 0 : Hold the absolute track number after playback or
recording
            // 1 : Renew the absolute trck number after playback or
recording
        UINT32 TagId;
    } DV_METADATA_TAG;

typedef struct _DV_METADATA_TITLE_TIME_CODE
    {
        DV_METADATA DVMetadata;
            // Binary Pack Layout
            // PC0 0 0 0 1 0 0 1 1
            // PC1 A 1 B B C C C C
            // PC2 1 D D D E E E E
            // PC3 1 F F F G G G G
            // PC4 1 1 H H I I I I
            //
            // A : Blank Flag
            // B : Tens of Frames
            // C : Units of Frames
            // D : Tens of Seconds
            // E : Units of Seconds
            // F : Tens of Minutes
            // G : Units of Minutes
            // H : Tens of Hours
            // I : Units of Hours
        BOOL Blank;
            // 0 : Discontinuity exists before the absolute track
number
            // 1 : Discontinuity does not exist before the absolute
track
        UINT32 Frame;
        UINT32 Second;
        UINT32 Minute;
        UINT32 Hour;
    } DV_METADATA_TITLE_TIME_CODE;

typedef struct _DV_METADATA_AAUX_BINARY_GROUP
    {
        DV_METADATA DVMetadata;
        DV_AUDIOBLOCK_ID DVAudioBlockId;
            // Binary Pack Layout
            // PC0 0 0 0 1 0 1 0 0     (For TITLE BINARY GROUP)
            // PC1 A A A A B B B B
            // PC2 C C C C D D D D
            // PC3 E E E E F F F F
            // PC4 G G G G H H H H
            //
            // A : Binary Group 2
```

```
        // B : Binary Group 1
        // C : Binary Group 4
        // D : Binary Group 3
        // E : Binary Group 6
        // F : Binary Group 5
        // G : Binary Group 8
        // H : Binary Group 7
    UINT32 BinaryGroup1;
    UINT32 BinaryGroup2;
    UINT32 BinaryGroup3;
    UINT32 BinaryGroup4;
    UINT32 BinaryGroup5;
    UINT32 BinaryGroup6;
    UINT32 BinaryGroup7;
    UINT32 BinaryGroup8;
} DV_METADATA_AAUX_BINARY_GROUP;

typedef struct _DV_METADATA_BINARY_GROUP
{
    DV_METADATA DVMetadata;
        // Binary Pack Layout
        // PC0 0 0 0 1 0 1 0 0     (For TITLE BINARY GROUP)
        // PC1 A A A A B B B B
        // PC2 C C C C D D D D
        // PC3 E E E E F F F F
        // PC4 G G G G H H H H
        //
        // A : Binary Group 2
        // B : Binary Group 1
        // C : Binary Group 4
        // D : Binary Group 3
        // E : Binary Group 6
        // F : Binary Group 5
        // G : Binary Group 8
        // H : Binary Group 7
    UINT32 BinaryGroup1;
    UINT32 BinaryGroup2;
    UINT32 BinaryGroup3;
    UINT32 BinaryGroup4;
    UINT32 BinaryGroup5;
    UINT32 BinaryGroup6;
    UINT32 BinaryGroup7;
    UINT32 BinaryGroup8;
} DV_METADATA_BINARY_GROUP;

typedef struct _DV_METADATA_PROGRAM_REC_DTIME
{
    DV_METADATA DVMetadata;
        // Binary Pack Layout
        // PC0 0 1 0 0 0 0 1 0
```

```
        // PC1  A   A   BM  B   B   B   BL
        // PC2  CM  C   CL  DM  D   D   DL
        // PC3  EM  E   E   FM  F   F   FL
        // PC4  E   E   E   EL  GM  G   GL
        //
        // A : Recording Mode
        // B : Minutes
        // C : Week
        // D : Hours
        // E : Year
        // F : Day
        // G : Month
    UINT32 RecordingMode;
        // 0 : Video
        // 1 : Audio
        // 2 : Audio Video
        // 3 : Duplicate
    UINT32 Minutes;
        // 3F : No information
    UINT32 Hours;
        // 1F : No information
    UINT32 Day;
    UINT32 Month;
    UINT32 Year;
        // Last two digits of Year
    UINT32 WeekDay;
        // 0 : Sunday
        // 1 : Monday
        // 2 : Tuesday
        // 3 : Wednsday
        // 4 : Thursday
        // 5 : Friday
        // 6 : Saturday
        // 7 : No Information
} DV_METADATA_PROGRAM_REC_DTIME;

typedef struct _DV_METADATA_AAUX_SOURCE
{
    DV_METADATA DVMetadata;
    DV_AUDIOBLOCK_ID DVAudioBlockId;

// Binary Pack Layout
        // PC0  0   1   0   1   0   0   0   0
        // PC1  A   1   B   B   B   B   B   B
        // PC2  C   D   D   E   F   F   F   F
        // PC3  1   G   H   I   I   I   I   I
        // PC4  J   K   L   L   L   M   M   M
        //
        // A : Locked Flag
        // B : Audio Frame Size
```

```
            // C : Stereo Mode
            // D : Audio Channels per audio block
            // E : Pair Bit
            // F : Audio Mode
            // G : Multi-Language Flag
            // H : 50/60
            // I : System Type
            // J : Emphasis Flag
            // K : Time Constatn of Emphasis
            // L : Sampling Frequency
            // M : Quantization
        BOOL LockedFlag;
            // 0 : Locked Mode
            // 1 : Unlocked Mode
        UINT32 AudioFrameSize;
        BOOL StereoMode;
            // 0 : Multi-Stereo audio
            // 1 : Lumped Audio
        UINT32 Channel;
            // 0 : One channel per audio block
            // 1 : Two channels per audio block
            // Others : Reserved
        BOOL PairBit;
            // 0 : One pair of channels
            // 1 : Independent channel
        UINT32 AudioMode;
            // The interpretation of auido mode depends on the Stereo
Mode,
            // the channel, and the audio block in question.  See
section
            // 8.1 of IEC 61834-4.
        BOOL MultiLanguage;
            // 0 : Recorded in Multi-Language
            // 1 : Not recorded in Multi-Language
        BOOL FiftySixty;
            // 0 : 60 Field System (NTSC)
            // 1 : 50 Field System (PAL)
        UINT32 SystemType;
            // Defines system type of video signal in combination with
50/60 flag
            // See section 8.1 of IEC 61834-4
        BOOL Emphasis;
            // 0 : Emphasis on
            // 1 : Emphasis off
        BOOL TimeConstant;
            // 1 : 50.15 micro-seconds
            // 0 : Reserved
        UINT32 SamplingFrequency;
        UINT32 Quantization;
    } DV_METADATA_AAUX_SOURCE;
```

```c
typedef struct _DV_METADATA_AAUX_SOURCE_CONTROL
{
    DV_METADATA DVMetadata;
    DV_AUDIOBLOCK_ID DVAudioBlockId;

// Binary Pack Layout
    // PC0 0 1 0 1 0 0 0 1
    // PC1 A A B B C C D D
    // PC2 E F G G H H H
    // PC3 I J J J J J J
    // PC4 1 K K K K K K
    //
    // A : Copy Gneration Management System
    // B : Input Source of Just Previous Recording
    // C : Number of times Compressed
    // D : Source Situation
    // E : Record Start
    // F : Record End
    // G : Record Mode
    // H : Insert Channel
    // I : Direction Flag
    // J : Speed
    // K : Genre Category
    UINT32 CopyGenerationManagementSystem;
        // 0 : Copying permitted without restriction
        // 1 : Not Used
        // 2 : One generation of copies permitted
        // 3 : No Copying Permitted
    UINT32 InputSource;
        // 0 : Analog input
        // 1 : Digital input
        // 2 : Reserved
        // 3 : No Information
    UINT32 Compression;
        // 0 : Compressed once
        // 1 : Compressed twice
        // 2 : Compressed three times or more
        // 3 : No Information
    UINT32 SourceSituation;
        // 0 : Scrambled source with audience restrictions
        // 1 : Scrambled source wihout audience restrictions
        // 2 : Source with audience restrictions or descrambled source with audience restrictions
        // 3 : No Information
    BOOL RecordingStart;
        // 0 : Recording start point
        // 1 : Not recording start point
    BOOL RecordingEnd;
        // 0 : Recording end point
```

```
            // 1 : Not recording end point
        UINT32 RecordMode;
            // 1 : Original
            // 3 : One channel inserted (CH1 or CH2 or CH3 or CH4)
            // 4 : Four channels inserted (CH1 and CH2 and CH2 and
CH4)
            // 5 : Two channels inserted (CH1 and CH2) or (CH3 and
CH4)
            // 7 : Invalid Recording (MUTE)
        UINT32 InsertChannel;
            // 0 : CH1
            // 1 : CH2
            // 2 : CH3
            // 3 : CH4
            // 4 : CH1 and CH2
            // 5 : CH3 and CH4
            // 6 : CH1 and CH2 and CH3 and CH4
            // 7 : No Information
        BOOL DirectionFlag;
            // 0 : Reverse Direction
            // 1 : Forward Direction
        UINT32 PlaybackSpeed;
            // See IEC 61834-4 Section 8.2
        UINT32 GenreCategory;
            // See IEC 61834-4 Section 3.3
    } DV_METADATA_AAUX_SOURCE_CONTROL;

typedef struct _DV_METADATA_AAUX_REC_DATE
    {
        DV_METADATA DVMetadata;
        DV_AUDIOBLOCK_ID DVAudioBlockId;
            // Binary Pack Layout
            // PC0 0 1 0 1 0 0 1 0    (For AAUX REC DATE)
            // PC1 A B C C D D D D
            // PC2 1 1 E E F F F F
            // PC3 G G G H I I I I
            // PC4 J J J J K K K K
            //
            // A : Daylight Savings
            // B : Thirty Minutes
            // C : Tens of Time Zone
            // D : Units of Time Zone
            // E : Tens of Day
            // F : Units of Day
            // G : Week
            // H : Tens of Month
            // I : Units of Month
            // J : Tens of Year
            // K : Units of Year
        BOOL DaylightSavingsTime;
```

```
            // 0 : Daylight Savings Time
            // 1 : Normal
        BOOL ThirtyMinutesFlag;
            // 0 : 30 Minutes
            // 1 : 00 Minutes
        UINT32 TimeZone;
        UINT32 Day;
        UINT32 Week;
        UINT32 Month;
        UINT32 LastTwoDigitsOfYear;
    } DV_METADATA_AAUX_REC_DATE;

typedef struct _DV_METADATA_VAUX_REC_DATE
    {
        DV_METADATA DVMetadata;

// Binary Pack Layout
            // PC0 0 1 1 0 0 0 1 0    (FOR VAUX REC DATE)
            // PC1 A B C C D D D D
            // PC2 1 1 E E F F F F
            // PC3 G G G H I I I I
            // PC4 J J J J K K K K
            //
            // A : Daylight Savings
            // B : Thirty Minutes
            // C : Tens of Time Zone
            // D : Units of Time Zone
            // E : Tens of Day
            // F : Units of Day
            // G : Week
            // H : Tens of Month
            // I : Units of Month
            // J : Tens of Year
            // K : Units of Year
        BOOL DaylightSavingsTime;
            // 0 : Daylight Savings Time
            // 1 : Normal
        BOOL ThirtyMinutesFlag;
            // 0 : 30 Minutes
            // 1 : 00 Minutes
        UINT32 TimeZone;
        UINT32 Day;
        UINT32 Week;
        UINT32 Month;
        UINT32 LastTwoDigitsOfYear;
    } DV_METADATA_VAUX_REC_DATE;

typedef struct _DV_METADATA_AAUX_REC_TIME
    {
        DV_METADATA DVMetadata;
```

```
        DV_AUDIOBLOCK_ID DVAudioBlockId;

// Binary Pack Layout
        // PC0  0 1 0 1 0 0 1 1      (For AAUX REC TIME)
        // PC1  1 1 A A B B B B
        // PC2  1 C C C D D D D
        // PC3  1 E E E F F F F
        // PC4  1 1 G G H H H H
        //
        // A : Tens of Frames
        // B : Units of Frames
        // C : Tens of Seconds
        // D : Units of Seconds
        // E : Tens of Minutes
        // F : Unites of Minutes
        // G : Tens of Hours
        // H : Units of Hours
    UINT32 Frame;
    UINT32 Second;
    UINT32 Minute;
    UINT32 Hour;
} DV_METADATA_AAUX_REC_TIME;

typedef struct _DV_METADATA_VAUX_REC_TIME
{
    DV_METADATA DVMetadata;

// Binary Pack Layout
        // PC0  0 1 1 0 0 0 1 1      (For VAUX REC TIME)
        // PC1  1 1 A A B B B B
        // PC2  1 C C C D D D D
        // PC3  1 E E E F F F F
        // PC4  1 1 G G H H H H
        //
        // A : Tens of Frames
        // B : Units of Frames
        // C : Tens of Seconds
        // D : Units of Seconds
        // E : Tens of Minutes
        // F : Unites of Minutes
        // G : Tens of Hours
        // H : Units of Hours
    UINT32 Frame;
    UINT32 Second;
    UINT32 Minute;
    UINT32 Hour;
} DV_METADATA_VAUX_REC_TIME;

typedef struct _DV_METADATA_AAUX_CLOSED_CAPTION
{
```

```
DV_METADATA DVMetadata;
DV_AUDIOBLOCK_ID DVAudioBlockId;

// Binary Pack Layout
    // PC0 0 1 0 1 0 1 0 1    (For AAUX CLOSED CAPTION)
    // PC1 1 1 A A A B B B
    // PC2 1 1 C C C D D D
    // PC3 1 1 1 1 1 1 1 1
    // PC4 1 1 1 1 1 1 1 1
    //
    // A : Main Audio Language
    // B : Main Audio Type
    // C : Second Audio Language
    // D : Second Audio Type
UINT32 MainAudioLanguage;
    // 0 : Unknown
    // 1 : English
    // 2 : Spanish
    // 3 : French
    // 4 : German
    // 5 : Italian
    // 6 : Others
    // 7 : None
UINT32 MainAudioType;
    // 0 : Unknown
    // 1 : Mono
    // 2 : Simulated stereo
    // 3 : True Stereo
    // 4 : Stereo surround
    // 5 : Data Srevice
    // 6 : Others
    // 7 : None
UINT32 SecondAudioLanguage;
    // 0 : Unknown
    // 1 : English
    // 2 : Spanish
    // 3 : French
    // 4 : German
    // 5 : Italian
    // 6 : Others
    // 7 : None
UINT32 SecondAudioType;
    // 0 : Unknown
    // 1 : Mono
    // 2 : Descriptive video service
    // 3 : Non-Program audio
    // 4 : Special Effects
    // 5 : Data Srevice
    // 6 : Others
    // 7 : None
```

```
} DV_METADATA_AAUX_CLOSED_CAPTION;

typedef struct _DV_METADATA_AAUX_TR
{
    DV_METADATA DVMetadata;
    DV_AUDIOBLOCK_ID DVAudioBlockId;

// Binary Pack Layout
        // PC0  0  1  0  1  0  1  1  0     (For AAUX TR)
        // PC1  A  A  A  AL B  B  B  B
        // PC2  A  A  A  A  A  A  A  A
        // PC3  A  A  A  A  A  A  A  A
        // PC4  AM A  A  A  A  A  A  A
        //
        // A : Data
        // B : Data type
    UINT32 DataType;
    UINT32 Data;
} DV_METADATA_AAUX_TR;

typedef struct _DV_METADATA_VAUX_TR
{
    DV_METADATA DVMetadata;

// Binary Pack Layout
        // PC0  0  1  1  0  0  1  1  1     (For VAUX TR)
        // PC1  A  A  A  AL B  B  B  B
        // PC2  A  A  A  A  A  A  A  A
        // PC3  A  A  A  A  A  A  A  A
        // PC4  AM A  A  A  A  A  A  A
        //
        // A : Data
        // B : Data type
    UINT32 DataType;
    UINT32 Data;
} DV_METADATA_VAUX_TR;

typedef struct _DV_METADATA_VAUX_SOURCE
{
    DV_METADATA DVMetadata;
        // Binary Pack Layout
        // PC0  0  1  1  0  0  0  0  0
        // PC1  A  A  A  A  B  B  B  B
        // PC2  C  D  E  E  F  F  F  F
        // PC3  G  G  H  I  I  I  I  I
        // PC4  J  J  J  J  J  J  J  J
        //
        // A : Tens of TV Channel
        // B : Units of TV Channel
        // C : B/W
```

```
        // D : Enable Color
        // E : Color frames identification
        // F : Hundreds of TV Channel
        // G : Source code
        // H : 50/60
        // I : Signal Type
        // J : Tuner Category
    UINT32 Channel;
    BOOL BlackAndWhiteFlag;
        // 0 : Black and White
        // 1 : Color
    BOOL ColorFramesEnableFlag;
        // 0 : CLF is valid
        // 1 : CLF is invalid
    UINT32 ColorFramesId;
        // For 525-60
        // 0 : Color Frame A
        // 1 : Color Frame B
        //
        // For 625-50
        // 0 : 1st, 2nd Field
        // 1 : 3rd, 4th Field
        // 2 : 5th, 6th Field
        // 3 : 7th, 8th Field
    UINT32 SourceCode;
    BOOL FiftySixty;
        // 0 : 60 Field System (NTSC)
        // 1 : 50 Field System (PAL)
    UINT32 SType;
    UINT32 TunerCategory;
} DV_METADATA_VAUX_SOURCE;

typedef struct _DV_METADATA_VAUX_SOURCE_CONTROL
{
    DV_METADATA DVMetadata;
        // Binary Pack Layout
        // PC0 0 1 1 0 0 0 0 1
        // PC1 A A B B C C D D
        // PC2 E 1 F F 1 G G G
        // PC3 H I J K L M N N
        // PC4 1 0 0 0 0 0 0 0
        //
        // A : Copy Generation Management System
        // B : Input source of just previous recording
        // C : The number of times of compression
        // D : Source and recorded situation
        // E : Recording start point
        // F : Record Mode
        // G : Display Select Mode
        // H : Frame/Field Flag
```

```
            // I : First/Second Flag
            // J : Frame Change Flag
            // K : Interlace Flag
            // L : Still-Field picture Flag
            // M : Still Camera Picture Flag
            // N : Broadcast System
            // O : Genre Category
        UINT32 CopyGenerationManagementSystem;
            // 0 : Copying permitted without restriction
            // 1 : Not used
            // 2 : One generation of copying permitted
            // 3 : No copying permitted
        UINT32 JustPreviousInput;
            // 0 : Analog
            // 1 : Digital
            // 2 : Reserved
            // 3 : No Information
        UINT32 Compression;
            // 0 : Compresssion once
            // 1 : Compression twice
            // 2 : Compression three times or more
            // 3 : No Information
        UINT32 SourceSituation;
            // 0 : Scrambled source with audience restrictions and recorded without descrambling
            // 1 : Scrambled source without audience restrictions and recoreded wihtout descrambling
            // 2 : Source with audience restrictions or descrambled source with audience restrictions
            // 3 : No Information
        BOOL RecordStart;
            // 0 : Recording start point
            // 1 : Not recording start point
        UINT32 RecordMode;
            // 0 : Original
            // 1 : Reserved
            // 2 : Insert
            // 3 : Invalid Recording
        UINT32 DisplaySelect;
        BOOL FrameField;
            // 0 : only one of two fields is output twice
            // 1 : both fields are output in order
        BOOL FirstSecond;
            // 0 : Field 2 is output
            // 1 : Field 2 is output
        BOOL FrameChange;
            //  0 : Same Picture as the immediate previous frame
            //  1 : Different Picture from the immediate previous frame
        BOOL Interlace;
```

```
        // 0 : Non-Interlaced
        // 1 : Interlaced or unrecognized
    BOOL StillField;
        // 0 : The time difference between the fields is
approximately 0s
        // 1 : The time difference between the fiels is
approximately 1.001/60 s or
        //     1/50 s
    BOOL StillCamera;
        // 0 : Still camera picture
        // 1 : Not Still Camera Picture
    UINT32 BroadcastSystem;
    UINT32 GenreCategory;
} DV_METADATA_VAUX_SOURCE_CONTROL;

typedef struct _DV_METADATA_VAUX_CLOSED_CAPTION
{
    DV_METADATA DVMetadata;
        // Binary Pack Layout
        // PC0 0 1 1 0 0 1 0 1     (For VAUX CLOSED CAPTION)
        // PC1 A A A A A A A A
        // PC2 B B B B B B B B
        // PC3 C C C C C C C C
        // PC4 D D D D D D D D
        //
        // A : 1st FIELD Line 21 1st BYTE
        // B : 1st FIELD Line 21 2nd BYTE
        // C : 2nd FIELD Line 21 1st BYTE
        // D : 2nd FILED Line 21 2nd BYTE UINT32 FirstFieldFirstByte;
    UINT32 FirstFieldSecondByte;
    UINT32 SecondFieldFirstByte;
    UINT32 SecondFieldSecondByte;
} DV_METADATA_VAUX_CLOSED_CAPTION;

typedef struct _DV_METADATA_CAMERA_CONSUMER_CAMERA_1
{
    DV_METADATA DVMetadata;
        // Binary Pack Layout
        // PC0 0 1 1 1 0 0 0 0
        // PC1 1 1 A A A A A A
        // PC2 B B B B B C C C
        // PC3 D D D E E E E E
        // PC4 F G G G G G G G
        //
        // A : Iris
        // B : Automatic Exposure Mode
```

```
        // C : Automatic Gain Control
        // D : White Balance Mode
        // E : White Balance
        // F : Focus Mode
        // G : Focus
    UINT32 Iris;
        // Position in terms of F number
        // 0 - 60 : IP where iris position = 2 ^ (IP / 8)
        // 61 : Under F1.0
        // 62 : Close
        // 63 : No Information
    UINT32 AEMode;
        // 0 : Full Automatic
        // 1 : Gain priority mode
        // 2 : Shutter priority mode
        // 3 : Iris priority mode
        // 4 : Manual
        // 15 : No Information
        // Others : Reserved
    UINT32 AGC;
        // 0 - 13 : G
        // 15 : No Information
    UINT32 WBMode;
        // 0 : Automatic
        // 1 : Hold
        // 2 : one-push
        // 3 : preset
        // 7 : No Information
        // Others : Reserved
    UINT32 WhiteBalance;
        // 0 : Candle
        // 1 : Incandescent lamp
        // 2 : Florescent lamp of low color temperature
        // 3 : Flourescent lamp of high color tempertaure
        // 4 : Sunlight
        // 5 : Cloudiness
        // 6 : Others
        // 31 : No Information
        // Others : Reserved
    BOOL FocusMode;
        // 0 : Automatic Focus
        // 1 : Manual Focus
    UINT32 FocusPosition;
        // 0 - 126 : Focus Postion = M x 10 ^ L
        //           where M is most significant 5 bits of focus
        //           and L is least significant 2 bits of focus
        // 127 : No Information
} DV_METADATA_CAMERA_CONSUMER_CAMERA_1;

typedef struct _DV_METADATA_CAMERA_CONSUMER_CAMERA_2
```

```
{
    DV_METADATA DVMetadata;
        // Binary Pack Layout
        // PC0 0 1 1 1 0 0 0 1
        // PC1 1 1 A B B B B B
        // PC2 C D E E E E E E
        // PC3 F F F F F F F F
        // PC4 G H H H I I I I
        //
        // A : Vertical Panning Direction
        // B : Vertical Panning Speed
        // C : Image Stabilizer
        // D : Horizontal Panning Direction
        // E : Horizontal Panning Speed
        // F : Focal Length
        // G : Zoom Enable Flag
        // H : Units of E-Zoom
        // I : 1/10 of E-Zoom
    BOOL VerticalPanningDirection;
        // 0 : Same direction as the vertical scanning
        // 1 : Opposite direction as the vertical scanning
    UINT32 VerticalPanningSpeed;
        // 0 - 29 : Panning Speed
        // 30 : More than 29 lines per field
        // 31 : No Information
    BOOL ImageStabilizer;
        // 0 : On
        // 1 : Off
    BOOL HorizontalPanningDirection;
        // 0 : Same direction as horizontal scanning
        // 1 : Opposite direction as horizontal scanning
    UINT32 HorizontalPanningSpeed;
        // 0 - 30 : Panning Speed
        // 62 : More than 122 pixels per field
        // 63 : No Information
    UINT32 FocalLength;
        // 0 - 254 : Focal Length
        // 255 : No Informtion
    BOOL ZoomEnable;
        // 0 : Electronic Zoom ON
        // 1 : Electronic Zoom Off
    UINT32 ElectricZoom;
        // 0 - 79 : 0.0 - 7.9 units of electric zoom
        // 126 : More than 8 times
        // 127 : No Information
} DV_METADATA_CAMERA_CONSUMER_CAMERA_2;

typedef struct _DV_METADATA_CAMERA_SHUTTER
{
    DV_METADATA DVMetadata;
```

```
        // Binary Pack Layout
        //
        // For Consumer Use
        //
        // PC0  0   1   1   1   1   1   1   1
        // PC1  1   1   1   1   1   1   1   1
        // PC2  1   1   1   1   1   1   1   1
        // PC3  A   A   A   A   A   A   A   AL
        // PC4  1   AM  A   A   A   A   A   A
        //
        // For Professional Use
        //
        // PC0  0   1   1   1   1   1   1   1
        // PC1  B   B   B   B   B   B   B   B
        // PC2  C   C   C   C   C   C   C   C
        // PC3  1   1   1   1   1   1   1   1
        // PC4  1   1   1   1   1   1   1   1
        //
        //
        // A : Shutter Speed
        // B : Upper Line Shutter Speed
        // C : Lower Line Shutter Speeed
        //
    UINT32 ShutterSpeed;
        // 0x0000 - 0x7FFE : Shutter Speed
        // 0x7FFF : No Information
    UINT32 UpperLineSpeed;
        // 0 - 254 : Shutter Speed
        // 255 : No Information
    UINT32 LowerLineSpeed;
} DV_METADATA_CAMERA_SHUTTER;
```

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
receiving an instruction specifying additional per-frame DV metadata to extract from a DV data stream, wherein the instruction comprises at least one of:
an AddPack call to add a DVPackID to an extraction list stored in memory;
a RemovePack call to remove the DVPackID from the extraction list; or
a RemoveAllPacks call to remove all DVPackIDs from the extraction list; and
extracting the metadata from a DV frame of the DV data stream in response to the instruction, wherein the extracting comprises:
determining the DVPackID from an extraction list; and
identifying the metadata within the DV frame based on the DVPackID.

2. A method as recited in claim 1, further comprising:
storing the metadata in a container; and
attaching the container to a video sample of the DV frame.

3. A method as recited in claim 2, further comprising managing the container.

4. A method as recited in claim 3, wherein the managing the container comprises:
adding a DV_METADATA structure to the container in response to an Add call;
removing a DV_METADATA structure from the container in response to a Remove call;
removing all items from the container in response to a RemoveAll call;
returning a number indicating an amount of items present in the container in response to a GetCount call;
locking the container for exclusive access in response to a Lock call;
unlocking the container in response to an Unlock call;
retrieving an item from the container at a beginning index of the container in response to a GetFirst call; and
retrieving an item from the container at a next index of the container in response to a GetNext call.

5. A method as recited in claim 4, wherein the DV_METADATA structure comprises an unpacked version of a DV metadata pack.

6. A method as recited in claim 5, wherein the DV_METADATA structure comprises:
binary values unpacked from the DV metadata pack; and
a different variable name associated with each binary value.

7. A method as recited in claim 1, further comprising:
returning a number indicating an amount of DVPackIDs present in the extraction list in response to a GetCount call; and
returning a DVPackID at an index in the extraction list in response to a GetPackID call that specifies the index.

8. A method as recited in claim 1, further comprising:
demultiplexing the DV frame to generate a video sample and an audio sample.

9. A method comprising:
managing a DV metadata extraction list stored in memory; and
extracting a DV metadata pack from a DV frame based on a DVPackID within the extraction list, wherein the extracting includes:
identifying the DV metadata pack in the DV frame through a header in the DV metadata pack that contains the DVPackID; and
pulling the DV metadata pack out of the DV frame.

10. A method as recited in claim 9, further comprising storing the DV metadata pack into an IMFDVMetadataContainer.

11. A method as recited in claim 10, further comprising attaching the IMFDVMetadataContainer to a DV sample of the DV frame.

12. A method as recited in claim 10, further comprising unpacking the DV metadata pack into a DV pack-specific data structure.

13. A method as recited in claim 12, further comprising storing the DV pack-specific data structure into the IMFDVMetadataContainer.

14. A method as recited in claim 12, wherein the DV pack-specific data structure comprises:
binary values unpacked from the DV metadata pack; and
a different variable name associated with each binary value.

15. A method as recited in claim 10, further comprising managing the IMFDVMetadataContainer.

16. A method as recited in claim 15, wherein the managing the IMFDVMetadataContainer comprises:
adding a DV_METADATA structure to the IMFDVMetadataContainer in response to an Add call;
removing a DV_METADATA structure from the IMFDVMetadataContainer in response to a Remove call;
removing all items from the IMFDVMetadataContainer in response to a RemoveAll call;
returning a number indicating an amount of items present in the IMFDVMetadataContainer in response to a GetCount call;
locking the IMFDVMetadataContainer for exclusive access in response to a Lock call;
unlocking the IMFDVMetadataContainer in response to an Unlock call;
retrieving an item from the IMFDVMetadataContainer at a beginning index of the IMFDVMetadataContainer in response to a GetFirst call; and
retrieving an item from the IMFDVMetadataContainer at a next index of the IMFDVMetadataContainer in response to a GetNext call.

17. A method as recited in claim 9, wherein the managing comprises:
adding a DVPackID to the extraction list in response to an AddPack call;
removing a DVPackID from the extraction list in response to a RemovePack call;
removing all DVPackIDs from the extraction list in response to a RemoveAllPacks call;
returning a number indicating an amount of DVPackIDs present in the extraction list in response to a GetCount call; and
returning a DVPackID at an index in the extraction list in response to a GetPackID call that specifies the index.

18. A method comprising:
managing DVPackIDs in a DV metadata extraction list based on method calls to a metadata extraction API (application programming interface);
extracting a DV metadata pack from a DV frame based on a DVPackID within the extraction list stored in memory;

unpacking the DV metadata pack into a DV pack-specific data structure;

storing the DV metadata pack and the DV pack-specific data structure in a container that is stored in memory;

attaching the container to a video sample of the DV frame; and managing access to the container based on method calls to a container API.

19. A computer comprising:

a DV metadata extraction tool configured to extract metadata from a DV frame and enable access to the metadata, the DV metadata extraction tool comprising:

an extraction interface configured to maintain an extraction list of DVPackIDs in response to method calls from an application and to store DV packs in a container based on the extraction list of DVPackIDs; and a container interface configured to store a DV pack-specific data structure in the container and to manage access to DV packs and DV pack-specific data structures in response to method calls from the application; and a multimedia architecture that includes the DV metadata extraction tool.

20. A computer comprising:

means for managing a DV metadata extraction list;

means for extracting a DV metadata pack from a DV frame based on a DVPackID within the extraction list; and means for storing the DV metadata pack into an IMFDVMetadataContainer.

21. A computer as recited in claim 20, further comprising means for attaching the IMFDVMetadataContainer to a DV sample of the DV frame.

22. A computer as recited in claim 20, further comprising:

means for unpacking the DV metadata pack into a DV pack-specific data structure; and means for storing the DV pack-specific data structure into the IMFDVMetadataContainer.

\* \* \* \* \*